United States Patent
Okada

(10) Patent No.: US 10,027,845 B2
(45) Date of Patent: Jul. 17, 2018

(54) IMAGE SCANNER, AND METHOD AND COMPUTER-READABLE MEDIUM THEREFOR

(71) Applicant: BROTHER KOGYO KABUSHIKI KAISHA, Nagoya-shi, Aichi-ken (JP)

(72) Inventor: Hidekazu Okada, Hashima (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/494,785

(22) Filed: Apr. 24, 2017

(65) Prior Publication Data

US 2017/0318188 A1 Nov. 2, 2017

(30) Foreign Application Priority Data

Apr. 28, 2016 (JP) .................. 2016-090351

(51) Int. Cl.
- *H04N 1/04* (2006.01)
- *H04N 1/40* (2006.01)
- *H04N 1/028* (2006.01)

(52) U.S. Cl.
CPC ..... *H04N 1/40056* (2013.01); *H04N 1/02845* (2013.01); *H04N 1/40012* (2013.01); *H04N 2201/0081* (2013.01)

(58) Field of Classification Search
CPC ........... H04N 1/40056; H04N 1/02845; H04N 1/40012; H04N 2201/0081
USPC ................................ 358/475, 474
See application file for complete search history.

(56) References Cited

U.S. PATENT DOCUMENTS

| | | | |
|---|---|---|---|
| 4,660,082 A * | 4/1987 | Tomohisa | H04N 1/401 348/251 |
| 8,605,347 B2 | 12/2013 | Suga | |
| 2007/0177026 A1 | 8/2007 | Sasaki | |
| 2008/0055668 A1* | 3/2008 | Hirayama | H04N 1/4076 358/461 |
| 2015/0229810 A1 | 8/2015 | Sugiyama et al. | |
| 2015/0229811 A1* | 8/2015 | Morita | H04N 1/6077 358/504 |

FOREIGN PATENT DOCUMENTS

| | | |
|---|---|---|
| JP | 9-102849 A | 4/1997 |
| JP | 2004-080730 A | 3/2004 |
| JP | 2007-201869 A | 8/2007 |

(Continued)

*Primary Examiner* — Houshang Safaipour
(74) *Attorney, Agent, or Firm* — Merchant & Gould P.C.

(57) ABSTRACT

An image scanner includes a controller configured to perform black data acquiring process for each color that includes, in a particular period of time, while controlling a light source to be turned off, controlling each of a plurality of light receiving elements to read an image of an object and transmit read data of the object to a shift register, and in a specific period of time next to the particular period of time, controlling the light source to emit light of a color different from the particular color, and controlling the shift register to output a plurality of pieces of image data of the object as a plurality of pieces of black data for the particular color, the plurality of pieces of image data corresponding to the plurality of pieces of read data of the object transmitted by the plurality of light receiving elements, respectively.

10 Claims, 19 Drawing Sheets

(56) References Cited

FOREIGN PATENT DOCUMENTS

| JP | 2011-176723 A | 9/2011 |
| JP | 2013-141079 A | 7/2013 |
| JP | 2015-154175 A | 8/2015 |

* cited by examiner

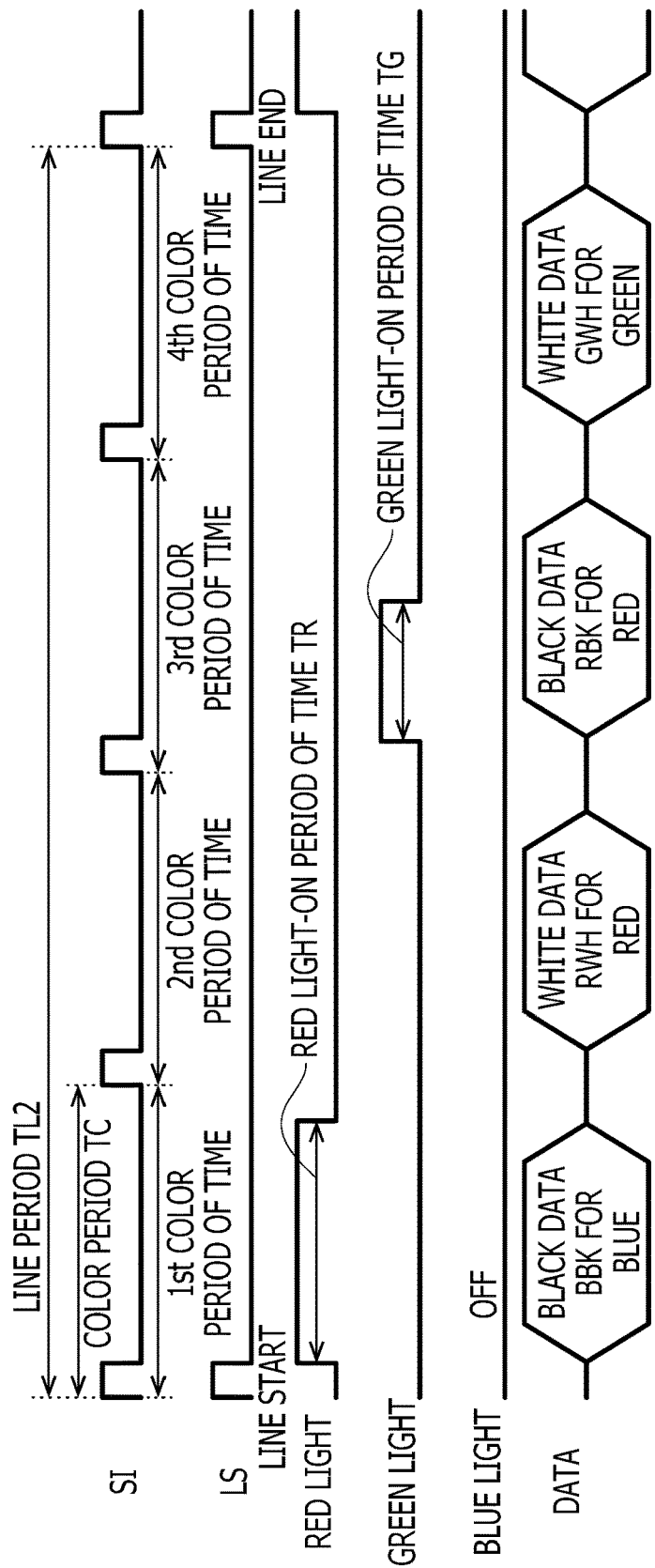

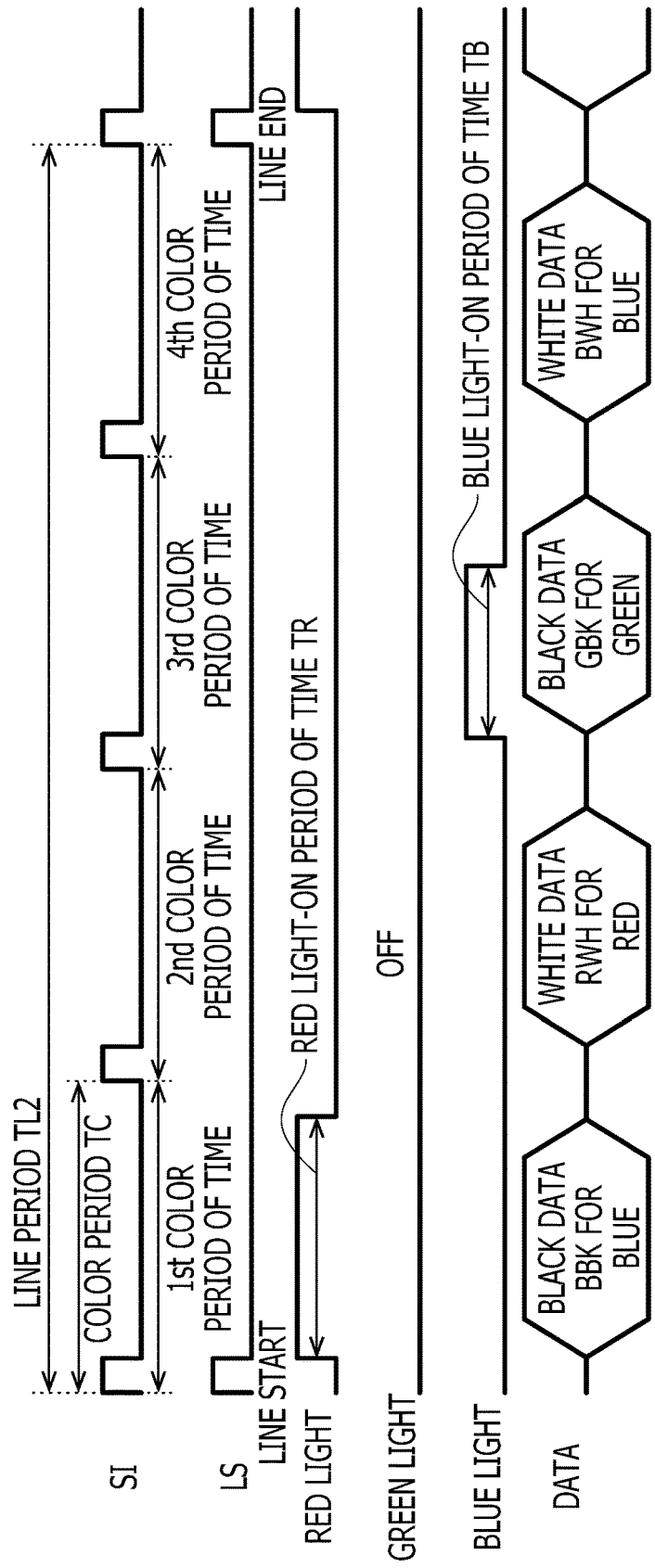

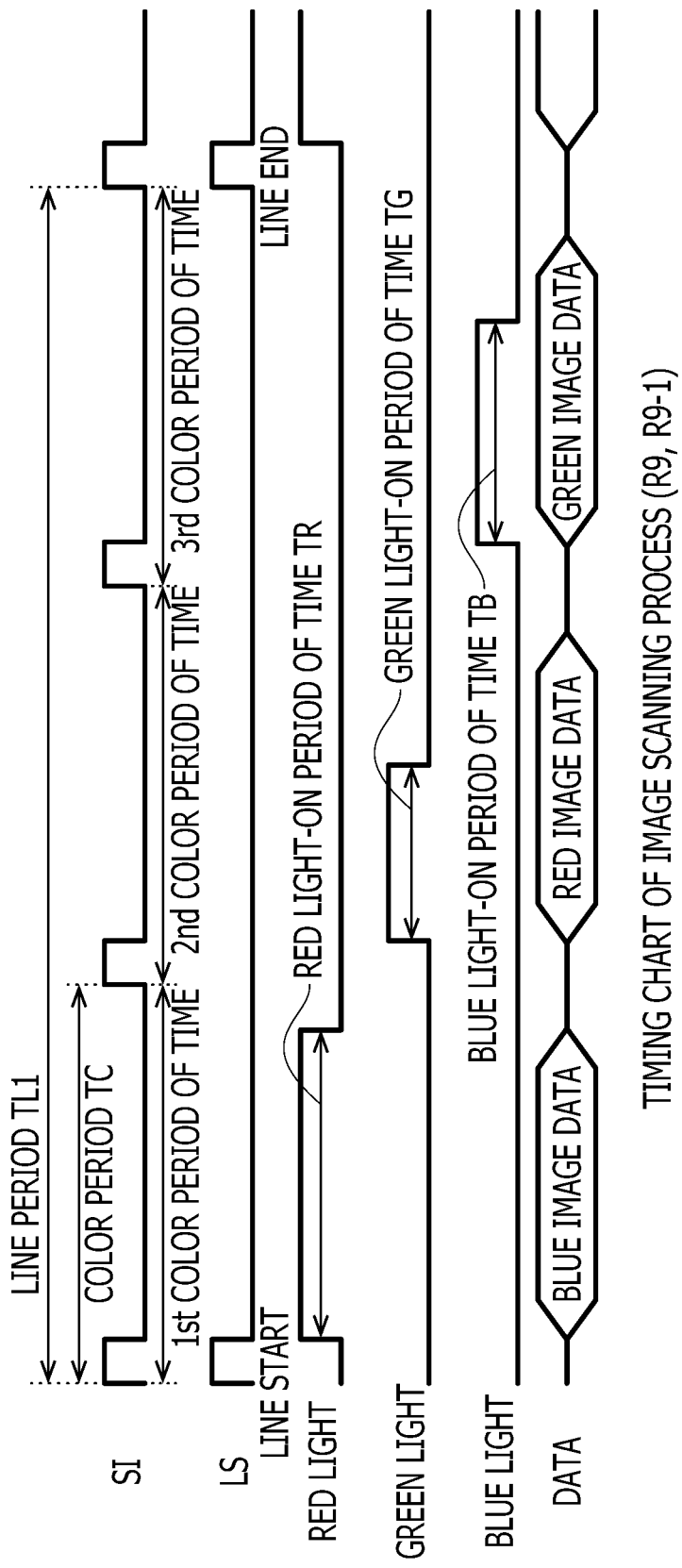

IMAGE SCANNER, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2016-090351 filed on Apr. 28, 2016. The entire subject matter of the application is incorporated herein by reference.

BACKGROUND

Technical Field

The following description relates to aspects of an image scanner, and a method and a computer-readable medium therefor.

Related Art

Heretofore, an image scanner has been known that includes an image sensor configured to read an image depicted on a document to separate colors of the image by emitting light onto the document while sequentially switching a color of the emitted light from one of a plurality of colors to another, and receiving reflected light from the document by light receiving elements.

For instance, the image scanner may include a light source having three LEDs each configured to emit light of a specific color of three colors, e.g., red, green, and blue. Further, the image scanner may control the light source to sequentially emit light of each color and receive reflected light from the document by the light receiving elements. At this time, the image scanner may perform light emission control for the light source to emit light of each color during a specific light-on period of time for each color. The specific light-on period of time is adjusted for each individual color such that a maximum value of read image data of each color is equal to maximum values of read image data of the other colors.

Further, in general, when an image is read by an image sensor, black correction is performed for read image data. More specifically, the black correction is performed by correcting the image data output from the image sensor based on black reference data.

In this regard, another image scanner has been known that is configured to generate black reference data from a plurality of lines of black data.

SUMMARY

Suppose for instance that an image scanner is configured to generate black reference data in the above known method and adjust a specific light-on period of time for each color during which the light source emits light of each color in the above known manner. It may be considered that the supposed image scanner acquires image data of each color by performing black correction using the same black reference data in common with the other colors while performing specific light emission control for each color. In this case, the following problem might be caused by the differences of the light emission control among the colors of light to be emitted by the light source. That is, a change in electrical current for the light source at a point of time when the light source starts emitting light and a change in electrical current for the light source at a point of time when the light source stops emitting light may emerge as crosstalk in the black data. When the light-on period of time is different among the colors of light to be emitted by the light source, a light-emission-start timing for the light source to start emitting light or a light-emission-stop timing for the light source to stop emitting light is different among the colors of light. Thereby, the point of time when the electrical-current change emerges as crosstalk in the black data varies depending on the differences of the light-on period of time among the colors of light. In this case, the black data differs depending on the differences of the light emission control among the colors of light. Thus, there is a problem that the differences of the black data, caused by the differences of the light emission control among the colors of light, make it impossible to perform accurate black correction.

Aspects of the present disclosure are advantageous to provide one or more improved techniques, for an image scanner, which make it possible to perform accurate black correction even when black data differs depending on differences of light emission control among a plurality of colors of light to be emitted by a light source.

According to aspects of the present disclosure, an image scanner is provided that includes an image scanning device including a light source configured to emit light of each of a plurality of colors, a predetermined number of light receiving elements arranged in line along a particular scanning direction, each light receiving element being configured to output read data corresponding to a quantity of light received by each light receiving element, and a shift register having a plurality of registers each connected with a corresponding one of the light receiving elements, the shift register being configured to output a plurality of pieces of image data corresponding to the plurality of pieces of read data output from the predetermined number of light receiving elements, respectively, a number of the plurality of pieces of read data and a number of the plurality of pieces of image data being equal to the predetermined number. The image scanner further includes a corrector configured to acquire a plurality of pieces of black-corrected image data by performing black correction for the plurality of pieces of image data output from the image scanning device, based on a plurality of pieces of black correction data, respectively, a number of the plurality of pieces of black-corrected image data and a number of the plurality of pieces of black correction data being equal to the predetermined number. The image scanner further includes a controller configured to perform a light-source adjusting process including adjusting a light quantity of light of each color to be emitted by the light source, in such a manner that a maximum value of a plurality of pieces of image data of each color output from the image scanning device is a particular value, perform black data acquiring process for each of the plurality of colors, the black data acquiring process for an individual particular color including controlling the light source to emit light of each color of the plurality of colors onto an object in the adjusted light quantity for each color in a specific period of time for each color, and to be turned off in a particular period of time, in the particular period of time, while controlling the light source to be turned off, controlling each of the light receiving elements to read an image of the object and transmit read data of the object to the shift register, and in a specific period of time next to the particular period of time, controlling the light source to emit light of a predetermined color different from the particular color, and controlling the shift register to output a plurality of pieces of image data of the object as a plurality of pieces of black data for the particular color, the plurality of pieces of image data corresponding to the plurality of pieces of read data of the object transmitted by the predetermined number of light receiving elements, respectively, and perform black correction data calculating process including calculating a plurality of pieces of black correction data for each color, based on the plurality of pieces of black data for each color, respectively.

According to aspects of the present disclosure, further provided is a method implementable on a processor coupled with an image scanner. The image scanner includes an image scanning device including a light source, a predetermined number of light receiving elements, and a shift register. The method includes performing a light-source adjusting process including adjusting a light quantity of light of each of a plurality of colors to be emitted by the light source, in such a manner that a maximum value of a plurality of pieces of image data of each color output from the image scanning device is a particular value, performing black data acquiring process for each of the plurality of colors, the black data acquiring process for an individual particular color including controlling the light source to emit light of each color of the plurality of colors onto an object in the adjusted light quantity for each color in a specific period of time for each color, and to be turned off in a particular period of time, in the particular period of time, while controlling the light source to be turned off, controlling each of the light receiving elements to read an image of the object and transmit read data of the object to the shift register, and in a specific period of time next to the particular period of time, controlling the light source to emit light of a predetermined color different from the particular color, and controlling the shift register to output a plurality of pieces of image data of the object as a plurality of pieces of black data for the particular color, the plurality of pieces of image data corresponding to the plurality of pieces of read data of the object transmitted by the predetermined number of light receiving elements, respectively, a number of the plurality of pieces of read data, a number of the plurality of pieces of image data, and a number of the plurality of pieces of black data for the particular color being equal to the predetermined number, and performing black correction data calculating process including calculating a plurality of pieces of black correction data for each color, based on the plurality of pieces of black data for each color, respectively, a number of the plurality of pieces of black correction data for each color being equal to the predetermined number.

According to aspects of the present disclosure, further provided is a non-transitory computer-readable medium storing computer-readable instructions that are executable on a processor coupled with an image scanner. The image scanner includes an image scanning device including a light source, a predetermined number of light receiving elements, and a shift register. The instructions are configured to, when executed by the processor, cause the processor to perform a light-source adjusting process including adjusting a light quantity of light of each of a plurality of colors to be emitted by the light source, in such a manner that a maximum value of a plurality of pieces of image data of each color output from the image scanning device is a particular value, perform black data acquiring process for each of the plurality of colors, the black data acquiring process for an individual particular color including controlling the light source to emit light of each color of the plurality of colors onto an object in the adjusted light quantity for each color in a specific period of time for each color, and to be turned off in a particular period of time, in the particular period of time, while controlling the light source to be turned off, controlling each of the light receiving elements to read an image of the object and transmit read data of the object to the shift register, and in a specific period of time next to the particular period of time, controlling the light source to emit light of a predetermined color different from the particular color, and controlling the shift register to output a plurality of pieces of image data of the object as a plurality of pieces of black data for the particular color, the plurality of pieces of image data corresponding to the plurality of pieces of read data of the object transmitted by the predetermined number of light receiving elements, respectively, and perform black correction data calculating process including calculating a plurality of pieces of black correction data for each color, based on the plurality of pieces of black data for each color, respectively, a number of the plurality of pieces of read data, a number of the plurality of pieces of image data, and a number of the plurality of pieces of black data for the particular color being equal to the predetermined number.

BRIEF DESCRIPTION OF THE ACCOMPANYING DRAWINGS

FIG. 15A is a timing chart of the red-green light-emitting data acquiring process in the second illustrative embodiment according to one or more aspects of the present disclosure.

FIG. 15B is a timing chart of the red-blue light-emitting data acquiring process in the second illustrative embodiment according to one or more aspects of the present disclosure.

FIG. 16 is a timing chart of an image scanning process included in the scanning main process according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Hereinafter, an image scanner 1 of a first illustrative embodiment according to aspects of the present disclosure will be described with reference to the accompanying drawings. A vertical direction and a front-to-rear direction of the image scanner 1 are indicated by arrows in FIG. 1.

<Mechanical Configuration of Image Scanner>

Figure 1:
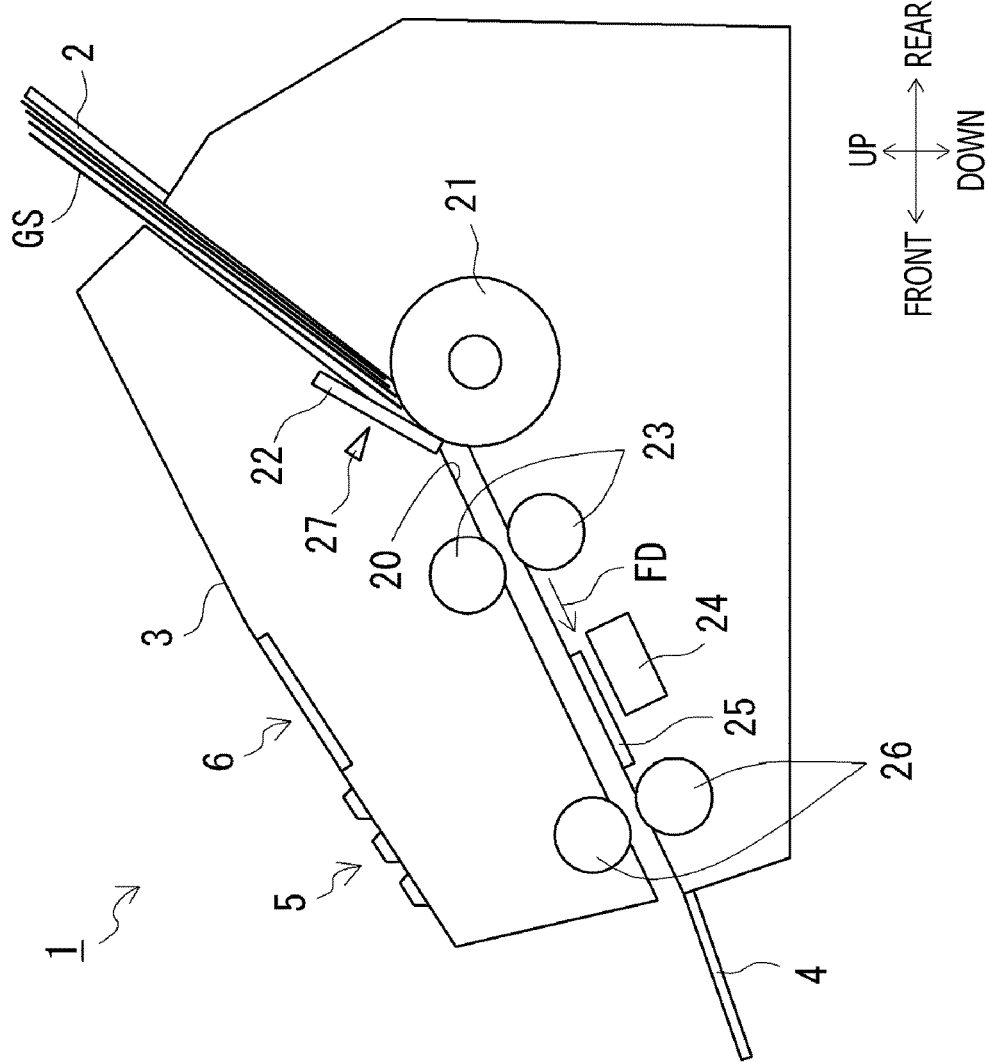
FIG. 1 is a side view schematically showing an internal configuration of an image scanner in a first illustrative embodiment according to one or more aspects of the present disclosure.

As shown in FIG. 1, the image scanner 1 includes a feed tray 2, a main body 3, and a discharge tray 4. An operation I/F ("I/F" is an abbreviated form of "interface") 5 and a display 6 are disposed on an upper surface of the main body 3. The operation I/F 5 includes a power switch and various setting buttons, and is configured to accept a user operation to provide an instruction. For instance, the operation I/F 5 includes a start button to provide an instruction to start an image reading operation, and operable buttons for setting a resolution. The display 6 includes an LCD ("LCD" is an abbreviated form of "Liquid Crystal Display"), and is configured to display a state of the image scanner 1.

A conveyance path 20 is formed inside the main body 3. A plurality of document sheets GS placed on the feed tray 2 are fed in a feeding direction FD along the conveyance path 20 and discharged onto a discharge tray 4. The image scanner 1 further includes a pickup roller 21, a separation pad 22, two upstream conveyance rollers 23, an image scanning device 24, a platen glass 25, and two downstream conveyance rollers 26 are disposed along the conveyance path 20.

The pickup roller 21 is configured to feed the plurality of document sheets GS placed on the feed tray 2 on a sheet-by-sheet basis in cooperation with the separation pad 22. The upstream conveyance rollers 23 and the downstream conveyance rollers 26 are driven by an ADF motor MT (see FIG. 4). The platen glass 25 is optically transparent and disposed along the conveyance path 20, under the conveyance path 20. The conveyance rollers 23 and 26 are configured to convey the document sheets GS fed by the pickup roller 21, in such a manner that the document sheets GS pass over the platen glass 25.

In the first illustrative embodiment, a downward-facing side of each document sheet GS placed on the feed tray 2 is an image-scanned surface to be scanned by the image scanning device 24. The image scanning device 24 is disposed below the conveyance path 20, and is configured to read the image-scanned surface of a document sheet GS passing over the platen glass 25. A document sensor 27 is disposed at the feed tray 2. The document sensor 27 is configured to be in an "ON" state when one or more document sheets GS are placed on the feed tray 2, and to be in an "OFF" state when there is no document sheet GS placed on the feed tray 2.

(Specific Configuration of Image Scanning Device)

Figure 2:
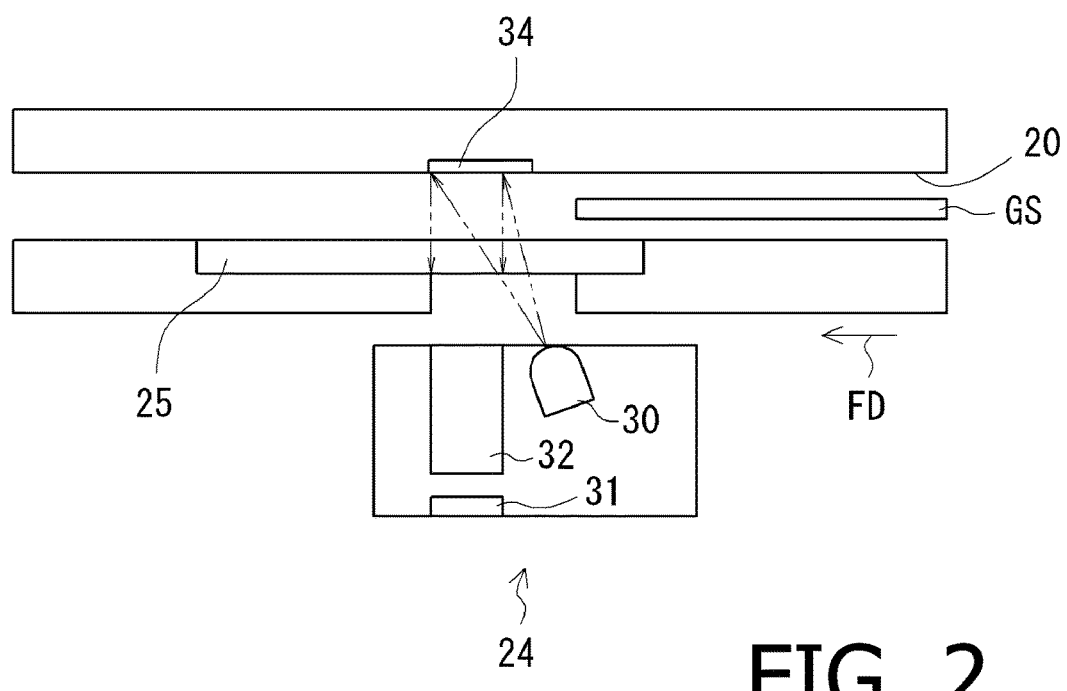
FIG. 2 is an enlarged view showing a configuration of an image scanning device included in the image scanner in the first illustrative embodiment according to one or more aspects of the present disclosure.

A specific configuration of the image scanning device 24 will be described with reference to FIGS. 2 and 3. As shown in FIG. 2, the image scanning device 24 includes a light source 30, a light receiver 31, and a rod lens array 32. The light source 30 is configured to emit light of each of three colors, e.g., red, green, and blue. Specifically, the light source 30 includes a single three-color LED chip having three LEDs each configured to emit light of a specific color of the three colors. For instance, when light emitted by the light source 30 is reflected by the image-scanned surface of the document sheet GS, the rod lens array 32 forms an image of the reflected light on the light receiver 31. In the first illustrative embodiment, in response to the three-color LED chip sequentially emitting light of each color of the three colors, a single line of image is scanned from the document sheet GS. The light source 30 further includes a light guide configured to guide the light emitted by the three-color LED chip in a main scanning direction MD.

A white reference plate 34 is disposed in a position to face the image scanning device 24 across the conveyance path 20. The white reference plate 34 has the same reflectance as a reflectance of a white color that is a background color of the document sheet GS. When there is no document sheet GS existing on the conveyance path 20, the light emitted by the light source 30 is reflected by the white reference plate 34, and the reflected light is received by the light receiver 31 via the rod lens array 32.

Figure 3:
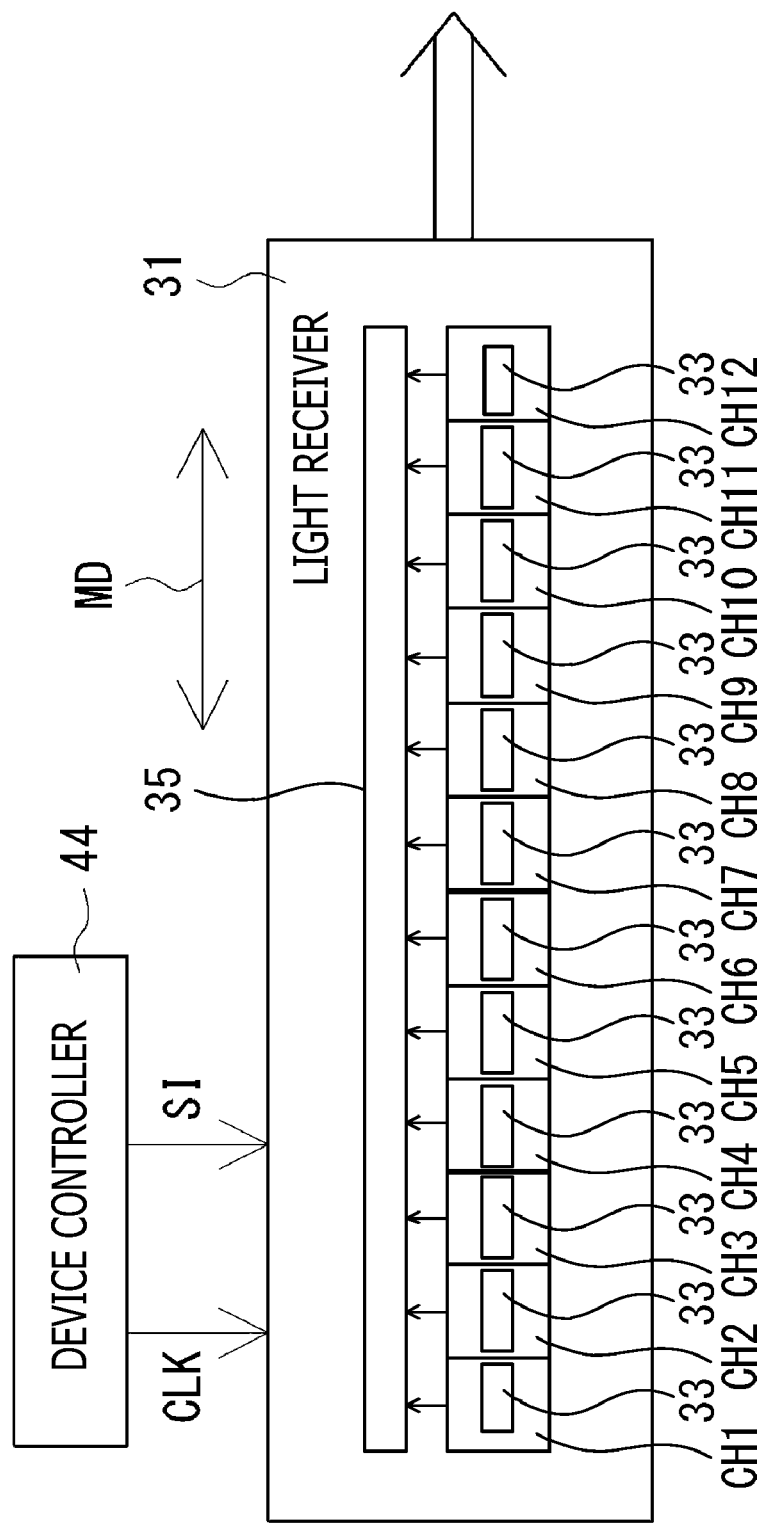
FIG. 3 is a block diagram showing a configuration of a light receiver of the image scanning device in the first illustrative embodiment according to one or more aspects of the present disclosure.

As shown in FIG. 3, the light receiver 31 includes twelve sensor IC chips CH1 to CH12 (hereinafter simply referred to as chips CH1 to CH12) and an analog shift register 35. The 12 chips CH1 to CH12 are linearly arranged in the main scanning direction MD. Each of the chips CH1 to CH12 includes a plurality of photoelectric transducers 33 arranged in the main scanning direction MD. Thus, a large number of photoelectric transducers 33 are arranged in the main scanning direction MD. Each photoelectric transducer 33 is configured to store charges corresponding to a quantity of light received by each photoelectric transducer 33 and output the stored charges to the analog shift register 35 as an electric signal of each pixel. The analog shift register 35 is configured to store electric signals for pixels as many as the photoelectric transducers 33. Each photoelectric transducer 33 is connected with a corresponding one of registers included in the analog shift register 35. An electric signal output from the analog shift register 35 is output as an analog signal via an amplifier (not shown). A head pixel is located at an upstream end portion, which is not adjacent to any chip, within the most-upstream chip CH1 in the main scanning direction MD. A final pixel is located at a downstream end portion, which is not adjacent to any chip, within the most-downstream chip CH12 in the main scanning direction MD. In the first illustrative embodiment, pixels included in each single chip of the chips CH1 to CH12 have the same output characteristics as each other. However, among the chips CH1 to CH12, the pixels of a chip have different output characteristics from those of the pixels of another chip. A single line is a pixel group including a plurality of pixels from the head pixel to the final pixel.

<Electrical Configuration of Image Scanner>

Figure 4:
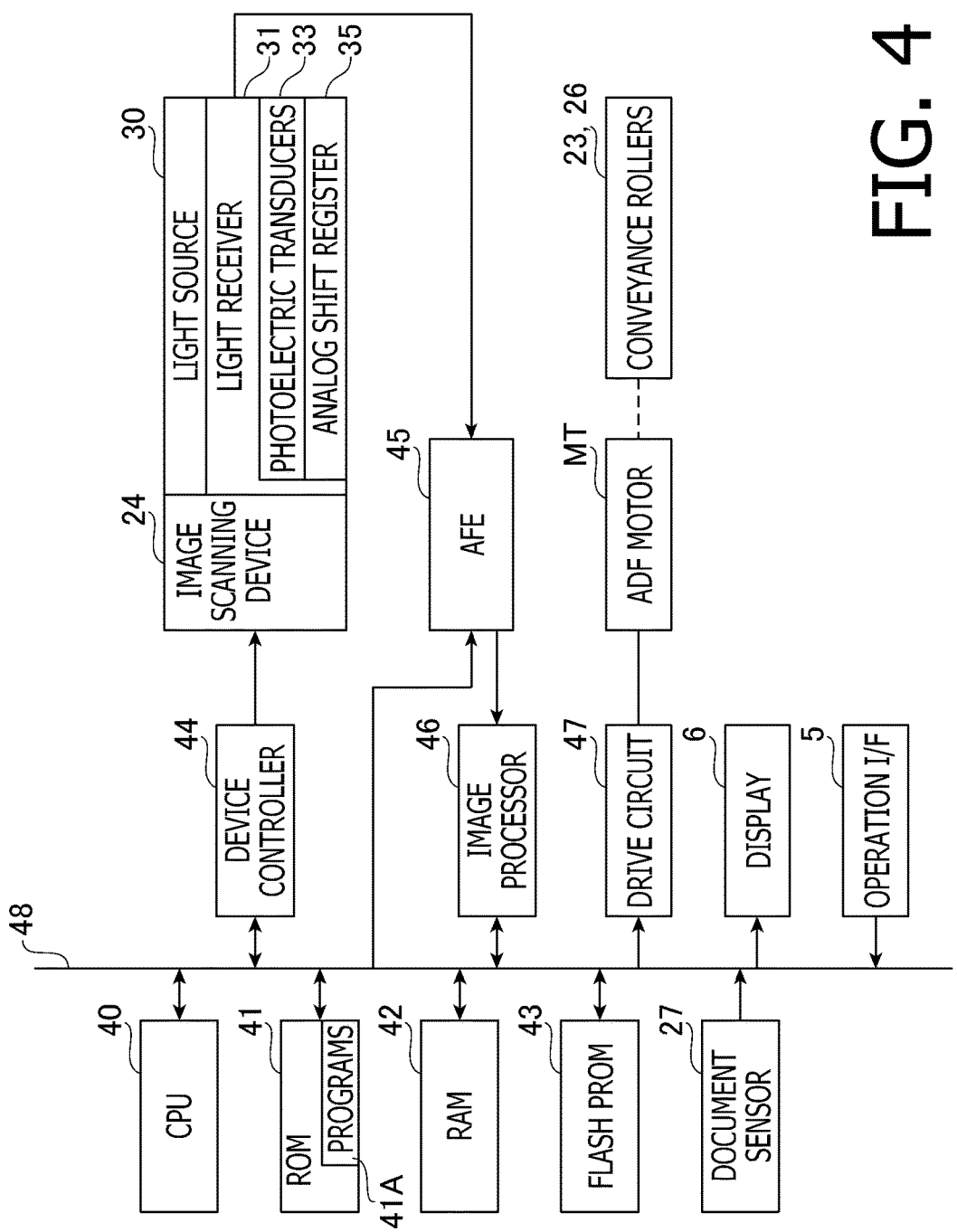
FIG. 4 is a block diagram showing an electrical configuration of the image scanner in the first illustrative embodiment according to one or more aspects of the present disclosure.

An electrical configuration of the image scanner 1 will be described with reference to FIG. 4. As shown in FIG. 4, the image scanner 1 includes a CPU 40, a ROM 41, a RAM 42, a flash PROM 43, a device controller 44, an analog front end (hereinafter referred to as an "AFE") 45, an image processor 46, and a drive circuit 47. The elements included in the image scanner 1 are connected with the operation I/F 5, the display 6, and the document sensor 27 via a bus 48.

The ROM 41 stores programs 41A for the image scanner 1 to execute various operations and processes such as a below-mentioned scanning main process and subroutine processes to be executed in the scanning main processes. The CPU 40 is configured to control each of elements included in the image scanner 1, in accordance with the programs 41A read out from the ROM 41. Further, the CPU 40 includes a line counter LC, and is configured to count the number of lines with the line counter LC. The flash PROM 43 is a readable/writable non-volatile memory. The flash PROM 43 stores various kinds of data to be set in control processes by the CPU 40 (e.g., data to be used to initialize various control parameters). The RAM 42 is configured to temporarily store computing results generated in control processes by the CPU 40.

The device controller 44 is connected with the image scanning device 24. The device controller 44 is configured to, based on instructions from the CPU 40, transmit to the light source 30 a control signal for turning on or off the light source 30 and a control signal for controlling an electrical current applied to the light source 30. Further, as shown in FIG. 3, the device controller 44 is configured to, based on instructions from the CPU 40, transmit a serial-in signal SI and a clock signal CLK to the light receiver 31. The serial-in signal SI is for concurrently transferring each of electrical signals from the large number of photoelectric transducers 33 of the chips CH1 to CH12 of the light receiver 31 to a corresponding one of the registers of the analog shift register 35. The clock signal CLK is for sequentially outputting electrical signals from the analog shift register 35 on a pixel-by-pixel basis. Further, the device controller 44 is configured to transmit line signals indicating a start and an end of each single-line scanning, to the CPU 40. In response to receiving these control signals from the device controller 44, the image scanning device 24 turns on the light source 30 and transmits to the AFE 45 an analog signal corresponding to a quantity of light received by the light receiver 31. Here, a maximum light-on period of time during which the light source 30 is emitting light is a maximum permissible period of time during which the light source 30 is allowed to emit light in an output interval of the serial-in signals SI.

The AFE 45 is connected with the image scanning device 24. The AFE 45 is configured to convert analog signals transmitted by the image scanning device 24 into digital data, based on instructions from the CPU 40. The AFE 45 has a predetermined input range and a predetermined resolution. For instance, the resolution may be 10 bits representing gradation from "0" to "1023." In this case, the AFE 45 converts analog signals transmitted by the image scanning device 24 into 10-bit gradation data (0 to 1023) as digital data. The digital data obtained through the conversion by the AFE 45 is transmitted to the image processor 46. For the AFE 45, an offset adjustment value and a gain adjustment value are set. The offset adjustment value represents an offset adjustment amount for making an offset adjustment for analog signals transmitted by the image scanning device 24. The gain adjustment value represents a gain adjustment amount for making a gain adjustment for the offset-adjusted analog signal. The AFE 45 converts the offset-adjusted and gain-adjusted analog signal into digital data.

The image processor 46 includes an ASIC configured specifically for image processing. The image processor 46 is configured to perform various kinds of image processing (including a correction process such as shading correction and gamma correction) for the digital data. The image processor 46 may be set not to perform any of the various kinds of image processing, and may be set to perform all of the various kinds of image processing. The image processor 46 performs one or more set kinds of image processing for the digital data and generates digital image data. The generated digital image data is stored into the RAM 42 via the bus 48. The shading correction may include white correction and black correction. For the image processor 46, black correction data for black correction and white correction data for white correction are set. For instance, when the image processor 46 is set to perform not gamma correction but shading correction, the image processor 46 generates the digital image data by performing black correction for the digital data in accordance with the set black correction data and performing white correction for the black-corrected digital data in accordance with the set white correction data.

The drive circuit 47 is connected with the ADF motor MT. The drive circuit 47 is configured to drive the ADF motor MT based on a drive instruction transmitted by the CPU 40. The drive circuit 47 rotates the ADF motor MT in accordance with a rotation amount and a rotational direction specified by the drive instruction. When the ADF motor MT rotates by the specified rotation amount, the conveyance rollers 23 and 26 rotate by a particular rotation angle, thereby conveying a document sheet GS over a particular distance along the conveyance path 20.

Operations in First Illustrative Embodiment

Subsequently, operations by the image scanner 1 in the first illustrative embodiment will be described with reference to the accompanying drawings. The image scanner 1 performs the scanning main process to scan the document sheets GS. Processes R1 to R9 and subroutine processes to be executed in the scanning main process are performed by the CPU 40 executing the programs 41A stored in the ROM 41. In the first illustrative embodiment, data processing to be executed by the CPU 40 for each pixel of the single line is performed with respect to each pixel for each color of the three colors.

(Scanning Main Process)

Figure 5:
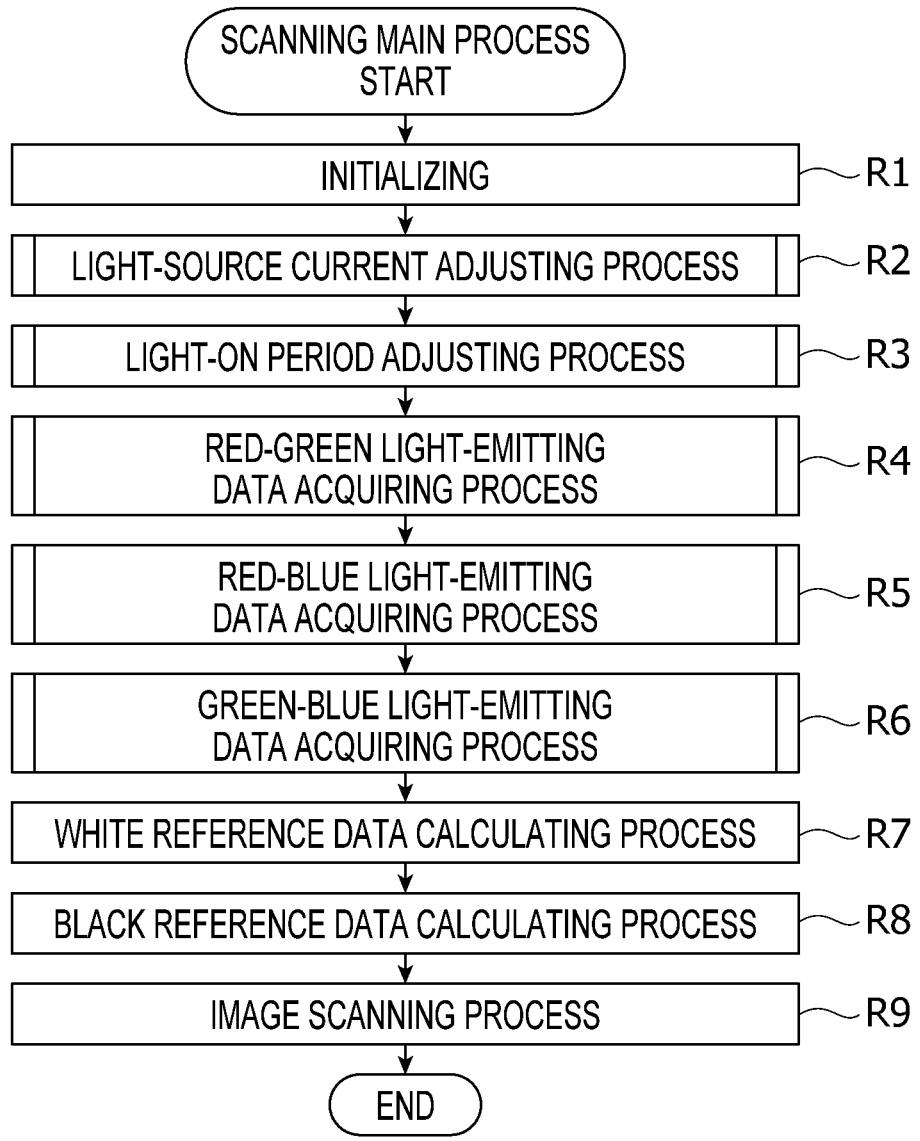
FIG. 5 is a flowchart showing a procedure of a scanning main process in the first illustrative embodiment according to one or more aspects of the present disclosure.

The scanning main process shown in FIG. 5 is started in response to a color scanning start button of the operation I/F 5 being pressed after document sheets GS are placed on the feed tray 2. In the first illustrative embodiment, the scanning main process for color scanning will be described.

The CPU 40 performs an initializing process to initialize the device controller 44, the AFE 45, and the image processor 46 (R1). Specifically, the CPU 40 acquires settings of the clock signal CLK and the serial-in signal SI from the flash PROM 43, and sets the acquired settings for the device controller 44. The CPU 40 acquires the offset adjustment value and the gain adjustment value from the flash PROM 43. Then, the CPU 40 sets the acquired offset adjustment value and the acquired gain adjustment value for the AFE 45. Further, the CPU 40 sets for the image processor 46 a setting to not perform any kind of image processing.

Figure 11A:
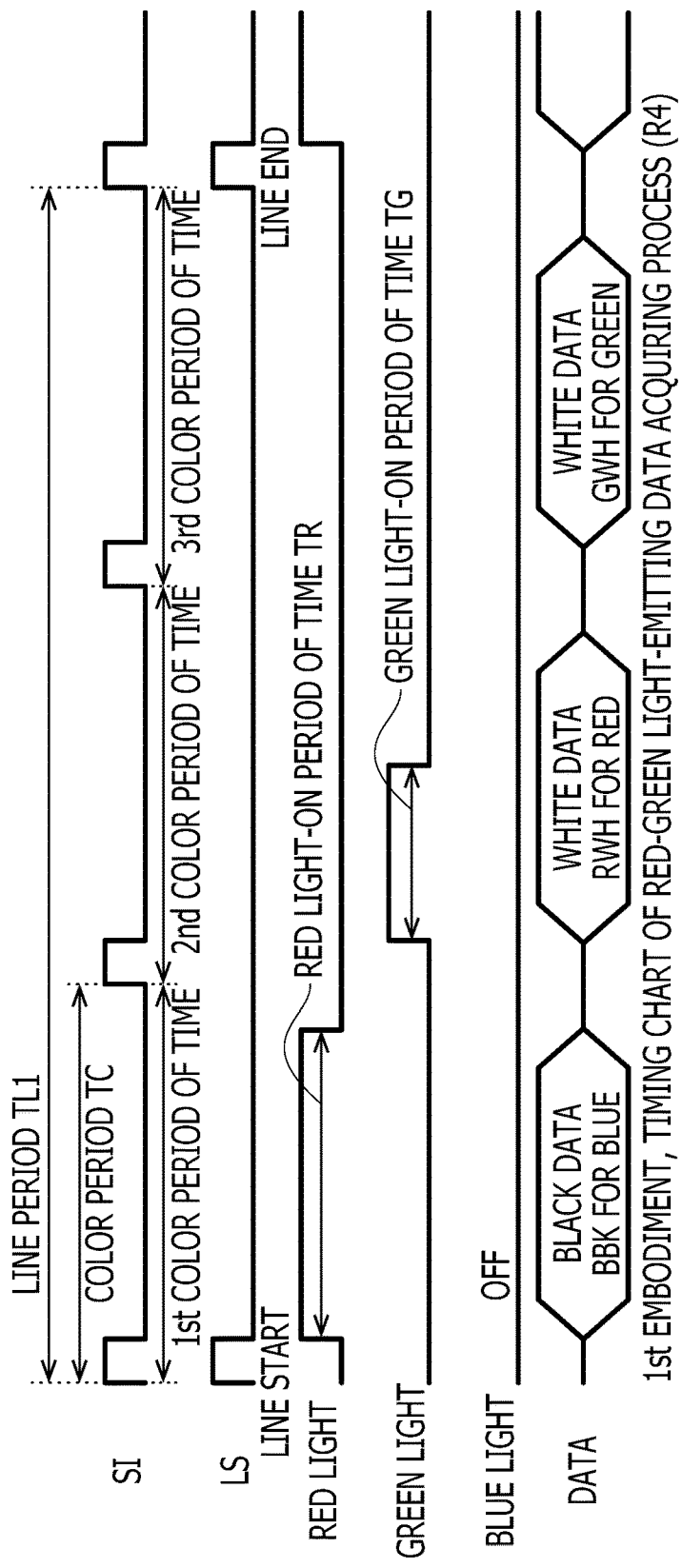
FIG. 11A is a timing chart of the red-green light-emitting data acquiring process in the first illustrative embodiment according to one or more aspects of the present disclosure.
Figure 11B:
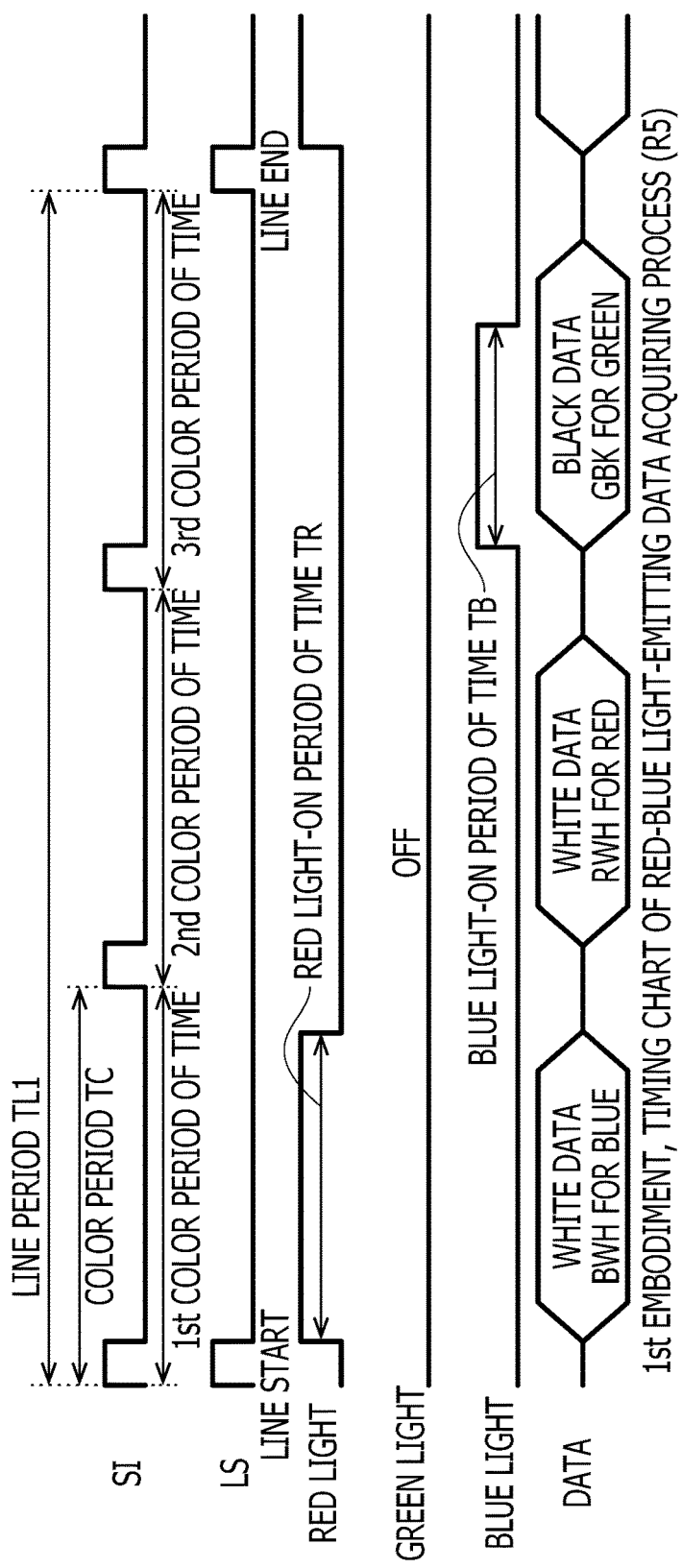
FIG. 11B is a timing chart of the red-blue light-emitting data acquiring process in the first illustrative embodiment according to one or more aspects of the present disclosure.
Figure 11C:
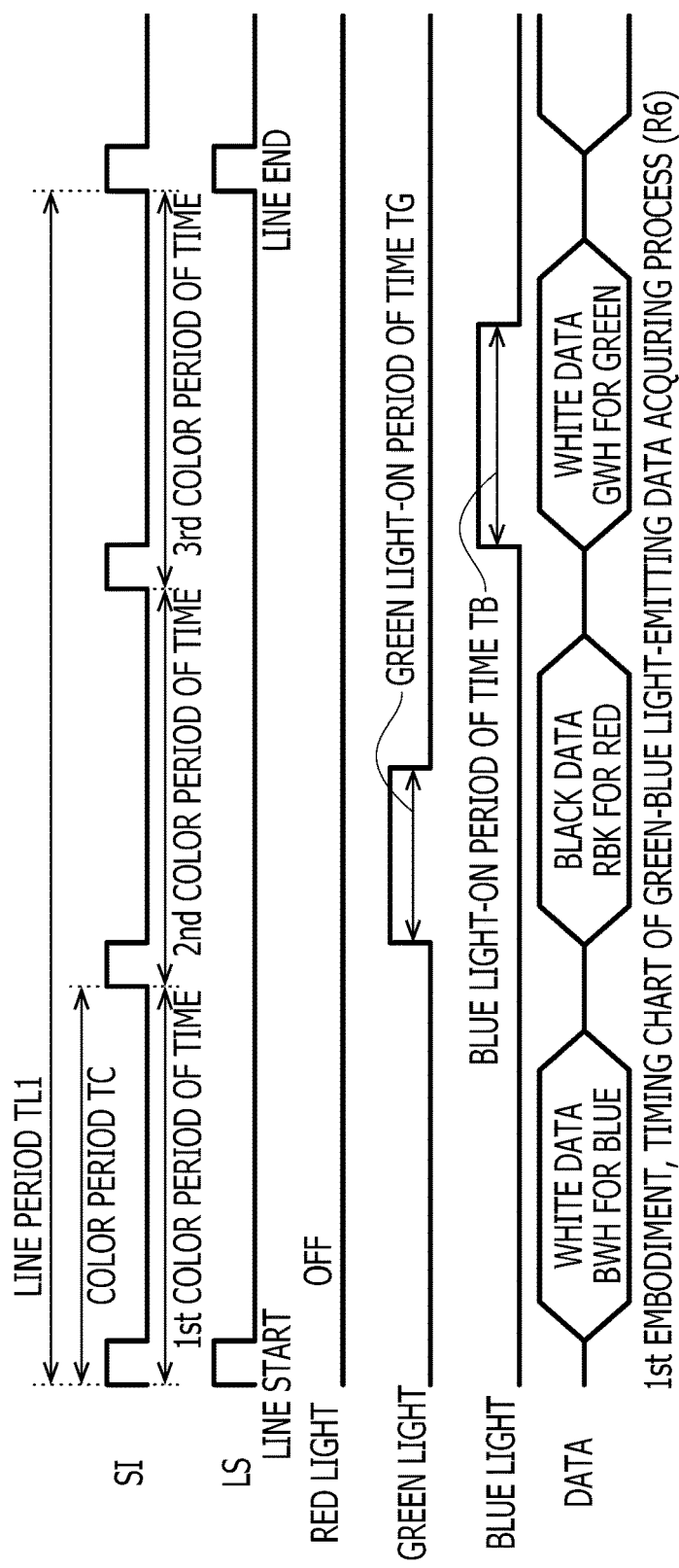
FIG. 11C is a timing chart of the green-blue light-emitting data acquiring process in the first illustrative embodiment according to one or more aspects of the present disclosure.

Referring to FIGS. 11A, 11B, and 11C, an explanation will be provided about a line period TL1 of the serial-in signal SI to be input into the image scanning device 24 in the first illustrative embodiment. In addition, an explanation will be provided about a first color period of time, a second color period of time, and a third color period of time, each of which is a specific period of time as long as a color period TC, within the line period TL1. Furthermore, output timings when the image scanning device 24 outputs analog signals will be described. In the first illustrative embodiment, the line period TL1 is set to be three times as long as the color period TC. A single line of digital image data in color scanning is data obtained by combining a single line of digital image data of red, a single line of digital image data of blue, and a single line of digital image data of green. The first color period of time is a first period of time as long as the color period TC, from a start of each single-line scanning. The second color period of time is a second period of time as long as the color period TC, following the first color period of time, from the start of each single-line scanning. The third color period of time is a third period of time as long as the color period TC, following the second color period of time, from the start of each single-line scanning. The image scanning device 24 stores electrical signals corresponding to light received in a first color period of time into the analog shift register 35, and outputs the electrical signals from the analog shift register 35 in a second color period of time. The image scanning device 24 stores electrical signals corresponding to light received in the second color period of time into the analog shift register 35, and outputs the electrical signals from the analog shift register 35 in a third color period of time. The image scanning device 24 stores electrical signals corresponding to light received in the third color period of time into the analog shift register 35, and outputs the electrical signals from the analog shift register 35 in a first color period of time. In the first illustrative embodiment, an end time of a line is coincident with a start time of a next line.

The CPU 40 performs a light-source current adjusting process to adjust a light-source current LI for the light source 30 (R2). Regarding the light-source current adjusting process (R2), although a more detailed explanation thereof will be provided later with reference to FIG. 6, a general explanation thereof is provided here. The CPU 40 adjusts a setting current value (i.e., a setting value of electrical current to be applied to the light source 30) for each color in such a manner that when the light source 30 is controlled to emit light of each color onto the white reference plate 34 during the maximum light-on period of time, signal levels of analog signals output from the image scanning device 24 receiving reflected light from the white reference plate 34 are substantially equal to a maximum value of the input range of the AFE 45. The CPU 40 determines, as the light-source current LI, a maximum value of the respective setting values of electrical current adjusted for the three colors (i.e., red, green, and blue).

The CPU 40 performs a light-on period adjusting process to adjust a red light-on period of time TR, a green light-on period of time TG, and a blue light-on period of time TB (R3). The red light-on period of time TR is a period of time during which the light source 30 is emitting red light. The green light-on period of time TG is a period of time during which the light source 30 is emitting green light. The blue light-on period of time TB is a period of time during which the light source 30 is emitting blue light. Regarding the light-on period adjusting process (R3), although a more detailed explanation thereof will be provided later with reference to FIG. 7, a general explanation thereof is provided here. The CPU 40 adjusts the red light-on period of time TR, the green light-on period of time TG, and the blue light-on period of time TB in such a manner that when the light source 30 is controlled to, with the light-source current LI applied thereto, emit light of each specific color onto the white reference plate 34, signal levels of analog signals output from the image scanning device 24 receiving reflected light from the white reference plate 34 are substantially equal to the maximum value of the input range of the AFE 45.

The CPU 40 performs a red-green light-emitting data acquiring process to acquire white data and black data by controlling the light source 30 to emit red light and green light without emitting blue light all the time (R4). Regarding the red-green light-emitting data acquiring process (R4), although a more detailed explanation thereof will be provided later with reference to FIG. 8, a general explanation thereof is provided here. As shown in FIG. 11A, the CPU 40 controls the light source 30 to emit red light in the first color period of time, to emit green light in the second color period of time, and to be turned off during the third color period of time. From the image processor 46, the CPU 40 acquires black data BBK for blue in the first color period of time, acquires white data RWH for red in the second color period of time, and acquires white data GWH for green in the third color period of time. By repeatedly acquiring the black data BBK for blue, the white data RWH for red, and the white data GWH for green, the CPU 40 acquires 32 lines of black data BBK for blue, 32 lines of white data RWH for red, and 32 lines of white data GWH for green. It is noted that the white data RWH for red is equivalent to digital data obtained when an image of white that is a background color of the document sheet is scanned with red light. The white data GWH for green is equivalent to digital data obtained when the white image is scanned with green light. The black data BBK for blue is equivalent to digital data obtained when an image of black that is the darkest color of the document sheet is scanned with blue light. In the first illustrative embodiment, the CPU 40 acquires 32 lines of white data and 32 lines of black data. By acquiring and averaging 32 lines of white data and 32 lines of black data, it is possible to calculate white reference data by reducing random noises superimposed on the white data and calculate black reference data by reducing random noises superimposed on the black data.

The CPU 40 performs a red-blue light-emitting data acquiring process to acquire white data and black data by controlling the light source 30 to emit red light and blue light without emitting green light all the time (R5). Regarding the red-blue light-emitting data acquiring process (R5), although a more detailed explanation thereof will be provided later with reference to FIG. 9, a general explanation thereof is provided here. As shown in FIG. 11B, the CPU 40 controls the light source 30 to emit red light in the first color period of time, to be turned off during the second color period of time, and to emit blue light in the third color period of time. From the image processor 46, the CPU 40 acquires white data BWH for blue in the first color period of time, acquires white data RWH for red in the second color period of time, and acquires black data GBK for green in the third color period of time. By repeatedly acquiring the white data BWH for blue, the white data RWH for red, and the black data GBK for green, the CPU 40 acquires 32 lines of white data BWH for blue, 32 lines of white data RWH for red, and 32 lines of black data GBK for green. It is noted that the white data BWH for blue is equivalent to digital data obtained when an image of white that is the background color of the document sheet is scanned with blue light. The white data RWH for red is equivalent to digital data obtained when the white image is scanned with red light. The black data GBK for green is equivalent to digital data obtained when an image of black that is the darkest color of the document sheet is scanned with green light.

The CPU 40 performs a green-blue light-emitting data acquiring process to acquire white data and black data by controlling the light source 30 to emit green light and blue light without emitting red light all the time (R6). Regarding the green-blue light-emitting data acquiring process (R6), although a more detailed explanation thereof will be provided later with reference to FIG. 10, a general explanation thereof is provided here. As shown in FIG. 11C, the CPU 40 controls the light source 30 to be turned off during the first color period of time, to emit green light in the second color period of time, and to emit blue light in the third color period of time. From the image processor 46, the CPU 40 acquires white data BWH for blue in the first color period of time, acquires black data RBK for red in the second color period of time, and acquires white data GWH for green in the third color period of time. By repeatedly acquiring the white data BWH for blue, the black data RBK for red, and the white data GWH for green, the CPU 40 acquires 32 lines of white data BWH for blue, 32 lines of black data RBK for red, and 32 lines of white data GWH for green. It is noted that the white data BWH for blue is equivalent to digital data obtained when an image of white that is the background color of the document sheet is scanned with blue light. The black data RBK for red is equivalent to digital data obtained when an image of black that is the darkest color of the document sheet is scanned with red light. The white data GWH for green is equivalent to digital data obtained when the white image is scanned with green light.

The CPU 40 performs a white reference data calculating process to calculate white reference data RFWH (R7). Specifically, the CPU 40 calculates white reference data RFWH for red by averaging all of the white data RWH for red (i.e., 64 lines of white data RWH for red in total) acquired in the processes R4 and R5, with respect to each pixel of the single line. The CPU 40 calculates white reference data RFWH for blue by averaging all of the white data BWH for blue (i.e., 64 lines of white data BWH for blue in total) acquired in the processes R5 and R6, with respect to each pixel of the single line. The CPU 40 calculates white reference data RFWH for green by averaging all of the white data GWH for green (i.e., 64 lines of white data GWH for green in total) acquired in the processes R4 and R6, with respect to each pixel of the single line. The white reference data RFWH includes the white reference data RFWH for red, the white reference data RFWH for blue, the white reference data RFWH for green.

The CPU 40 performs a black reference data calculating process to calculate black reference data RFBK (R8). Specifically, the CPU 40 calculates black reference data RFBK for red by averaging all of the black data RBK for red (i.e., 32 lines of black data RBK for red) acquired in the process R6, with respect to each pixel of the single line. The CPU 40 calculates black reference data RFBK for blue by averaging all of the black data BBK for blue (i.e., 32 lines of black data BBK for blue) acquired in the process R4, with respect to each pixel of the single line. The CPU 40 calculates black reference data RFBK for green by averaging all of the black data GBK for green (i.e., 32 lines of black data GBK for green) acquired in the process R5, with respect to each pixel of the single line. The black reference data RFBK includes the black reference data RFBK for red, the black reference data RFBK for blue, the black reference data RFBK for green.

The CPU 40 performs an image scanning process (R9). Specifically, the CPU 40 sets, for the image processor 46, setting values for performing various kinds of image processing. The CPU 40 sets, for the image processor 46, the black reference data RFBK as black correction data. The CPU 40 sets, for the image processor 46, the white reference data RFWH as white correction data. The CPU 40 transmits to the drive circuit 47 an instruction to convey a document sheet GS. The CPU 40 controls the image scanning device 24 to scan the conveyed document sheet GS. Based on the black reference data RFBK calculated in the process R8, the CPU 40 performs black correction for the scanned digital data with respect to each of the three colors. Further, based on the white reference data RFWH calculated in the process R7, the CPU 40 performs white correction for the black-corrected digital data with respect to each of the three colors. The CPU 40 generates digital image data by performing various correction processes for the white-corrected digital data. After execution of the process R9, the CPU 40 terminates the scanning main process.

Referring to FIG. 16, an explanation will be provided about a line period TL1 of the serial-in signal SI to be input into the image scanning device 24 in the image scanning process. In addition, an explanation will be provided about a first color period of time, a second color period of time, and a third color period of time, each of which is a specific period of time as long as the color period TC within the line period TL1. Furthermore, output timings when the image scanning device 24 outputs analog signals will be described. In the image scanning process, the line period TL1 of the serial-in signal SI is set to be three times as long as the color period TC. The first color period of time is a first period of time as long as the color period TC, from a start of each single-line scanning. In the first color period of time, the light source 30 emits red light. The second color period of time is a second period of time as long as the color period TC, following the first color period of time, from the start of each single-line scanning. In the second color period of time, the light source 30 emits green light. The third color period of time is a third period of time as long as the color period TC, following the second color period of time, from the start of each single-line scanning. In the third color period of time, the light source 30 emits blue light. The image reading device 24 stores electrical signals corresponding to red light received in a first color period of time into the analog shift register 35, and outputs the electrical signals as red image data from the analog shift register 35 in a second color period of time. The image reading device 24 stores electrical signals corresponding to green light received in the second color period of time into the analog shift register 35, and outputs the electrical signals as green image data from the analog shift register 35 in a third color period of time. The image reading device 24 stores electrical signals corresponding to blue light received in the third color period of time into the analog shift register 35, and outputs the electrical signals as blue image data from the analog shift register 35 in a first color period of time.

(Light-Source Current Adjusting Process)

Figure 6:
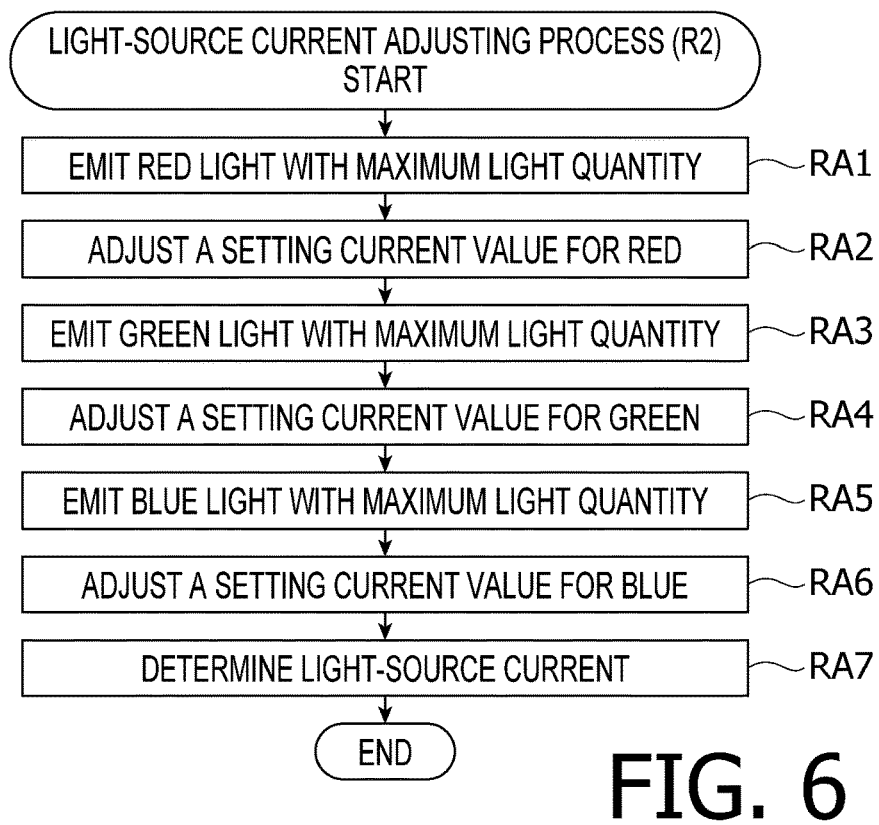
FIG. 6 is a flowchart showing a procedure of a light-source current adjusting process of the scanning main process in the first illustrative embodiment according to one or more aspects of the present disclosure.

When the light-source current adjusting process (R2) shown in FIG. 6 is started, the CPU 40 controls the light source 30 to emit red light in a maximum light quantity (RA1). Specifically, the CPU 40 controls the light source 30 to emit red light with a predetermined maximum current value during a predetermined maximum light-on period of time. In the first illustrative embodiment, in processes RA2, RA4, and RA6, the CPU 40 adjusts a setting current value by reducing the setting current value from the maximum light quantity. Therefore, the CPU 40 controls the light source 30 to emit light in the maximum light quantity in processes RA1, RA3, and RA5.

The CPU 40 adjusts a setting current value (i.e., a setting value of electrical current applied to the light source 30) for red (RA2). Specifically, while controlling the light source 30 to emit red light onto the white reference plate 34 during the maximum light-on period of time, the CPU 40 adjusts the setting current value for red with reference to digital image data in such a manner that signal levels of analog signals output from the image scanning device 24 receiving reflected light from the white reference plate 34 are substantially equal to the maximum value of the input range of the AFE 45.

The CPU 40 controls the light source 30 to emit green light in a maximum light quantity (RA3). Specifically, the CPU 40 controls the light source 30 to emit green light with a predetermined maximum current value during a predetermined maximum light-on period of time.

The CPU 40 adjusts a setting current value (i.e., a setting value of electrical current applied to the light source 30) for green (RA4). Specifically, while controlling the light source 30 to emit green light onto the white reference plate 34 during the maximum light-on period of time, the CPU 40 adjusts the setting current value for green with reference to digital image data in such a manner that signal levels of analog signals output from the image scanning device 24 receiving reflected light from the white reference plate 34 are substantially equal to the maximum value of the input range of the AFE 45.

The CPU 40 controls the light source 30 to emit blue light in a maximum light quantity (RA5). Specifically, the CPU 40 controls the light source 30 to emit blue light with a predetermined maximum current value during a predetermined maximum light-on period of time.

The CPU 40 adjusts a setting current value (i.e., a setting value of electrical current applied to the light source 30) for blue (RA6). Specifically, while controlling the light source 30 to emit blue light onto the white reference plate 34 during the maximum light-on period of time, the CPU 40 adjusts the setting current value for blue with reference to digital image data in such a manner that signal levels of analog signals output from the image scanning device 24 receiving reflected light from the white reference plate 34 are substantially equal to the maximum value of the input range of the AFE 45.

The CPU 40 determines the light-source current LI (RA7). Specifically, the CPU 40 determines, as the light-source current LI, a maximum value of the respective setting current values for the three colors that have been adjusted in the processes RA2, RA4, and RA6. Thereby, with respect to a specific color for which the setting current value is determined as the light-source current LI, when the light source 30 emits light of the specific color with the light-source current LI during the maximum light-on period of time, signal levels of analog signals output from the image scanning device 24 are substantially equal to the maximum value of the input range of the AFE 45. Therefore, the maximum light-on period of time for the specific color is a below-mentioned light-on period of time to be adjusted. Thus, it is possible to set a light-off period of time for the specific color as short as possible, and to reduce data loss. After execution of the process RA7, the CPU 40 terminates the light-source current adjusting process (R2).

(Light-on Period Adjusting Process)

Figure 7:
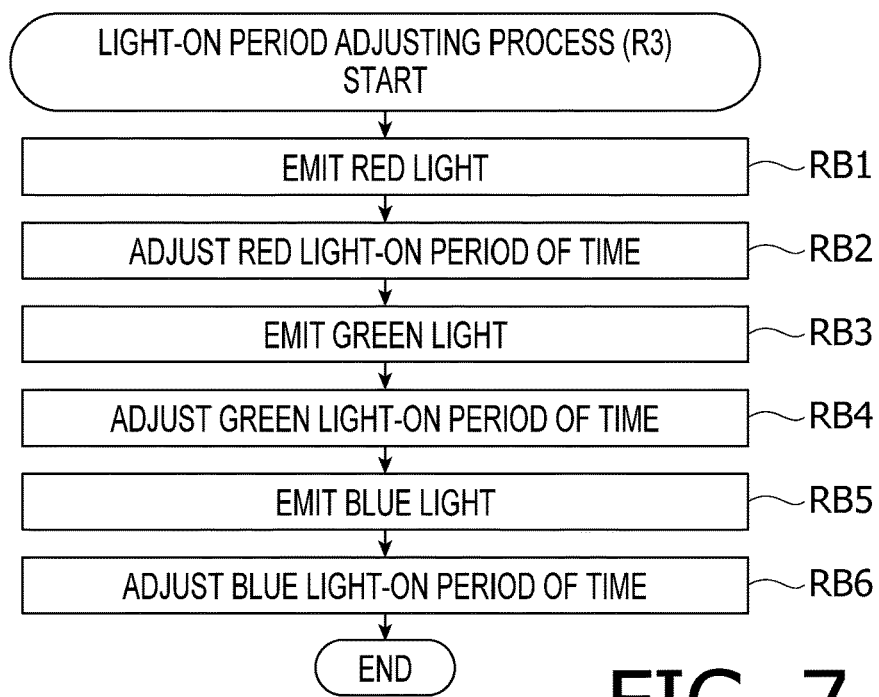
FIG. 7 is a flowchart showing a procedure of a light-on period adjusting process of the scanning main process in the first illustrative embodiment according to one or more aspects of the present disclosure.

When a light-on period adjusting process (R3) shown in FIG. 7 is started, the CPU 40 controls the light source 30 to emit red light (RB1). Specifically, the CPU 40 controls the light source 30 to emit red light with the light-source current LI during the maximum light-on period of time.

The CPU 40 adjusts the red light-on period of time TR (RB2). Specifically, while controlling the light source 30 to emit red light onto the white reference plate 34 with the light-source current LI, the CPU 40 adjusts the red light-on period of time TR with reference to digital image data in such a manner that signal levels of analog signals output from the image scanning device 24 receiving reflected light from the white reference plate 34 are substantially equal to the maximum value of the input range of the AFE 45. In this case, a light quantity when the light source 30 is controlled to emit red light with the light-source current LI during the red light-on period of time TR is a red light quantity ST.

The CPU 40 controls the light source 30 to emit green light (RB3). Specifically, the CPU 40 controls the light source 30 to emit green light with the light-source current LI during the maximum light-on period of time.

The CPU 40 adjusts the green light-on period of time TG (RB4). Specifically, while controlling the light source 30 to emit green light onto the white reference plate 34 with the light-source current LI, the CPU 40 adjusts the green light-on period of time TG with reference to digital image data in such a manner that signal levels of analog signals output from the image scanning device 24 receiving reflected light from the white reference plate 34 are substantially equal to the maximum value of the input range of the AFE 45. In this case, a light quantity when the light source 30 is controlled to emit green light with the light-source current LI during the green light-on period of time TG is a green light quantity ST.

The CPU 40 controls the light source 30 to emit blue light (RB5). Specifically, the CPU 40 controls the light source 30 to emit blue light with the light-source current LI during the maximum light-on period of time.

The CPU 40 adjusts the blue light-on period of time TB (RB6). Specifically, while controlling the light source 30 to emit blue light onto the white reference plate 34 with the light-source current LI, the CPU 40 adjusts the blue light-on period of time TB with reference to digital image data in such a manner that signal levels of analog signals output from the image scanning device 24 receiving reflected light from the white reference plate 34 are substantially equal to the maximum value of the input range of the AFE 45. In this case, a light quantity when the light source 30 is controlled to emit blue light with the light-source current LI during the blue light-on period of time TB is a blue light quantity ST. After execution of the process RB6, the CPU 40 terminates the light-on period adjusting process (R3).

Usually, the red light-on period of time TR, the green light-on period of time TG and the blue light-on period of time TB are adjusted in respective different processes, and therefore are different in length from each other. In the first illustrative embodiment, as shown in FIG. 16, the maximum light-on period of time, which is the red light-on period of time TR, is equal in length to an output period of time during which analog signals of blue image data are output. Further, both of the maximum light-on period of time and the output period of time for blue image data start at the same point of time and end at the same point of time. Hence, in the first illustrative embodiment, the green light-on period of time TG and the blue light-on period of time TB are shorter than an output period of time for analog signals of red image data and an output period of time for analog signals of green image data.

(Red-Green Light-Emitting Data Acquiring Process)

Figure 8:
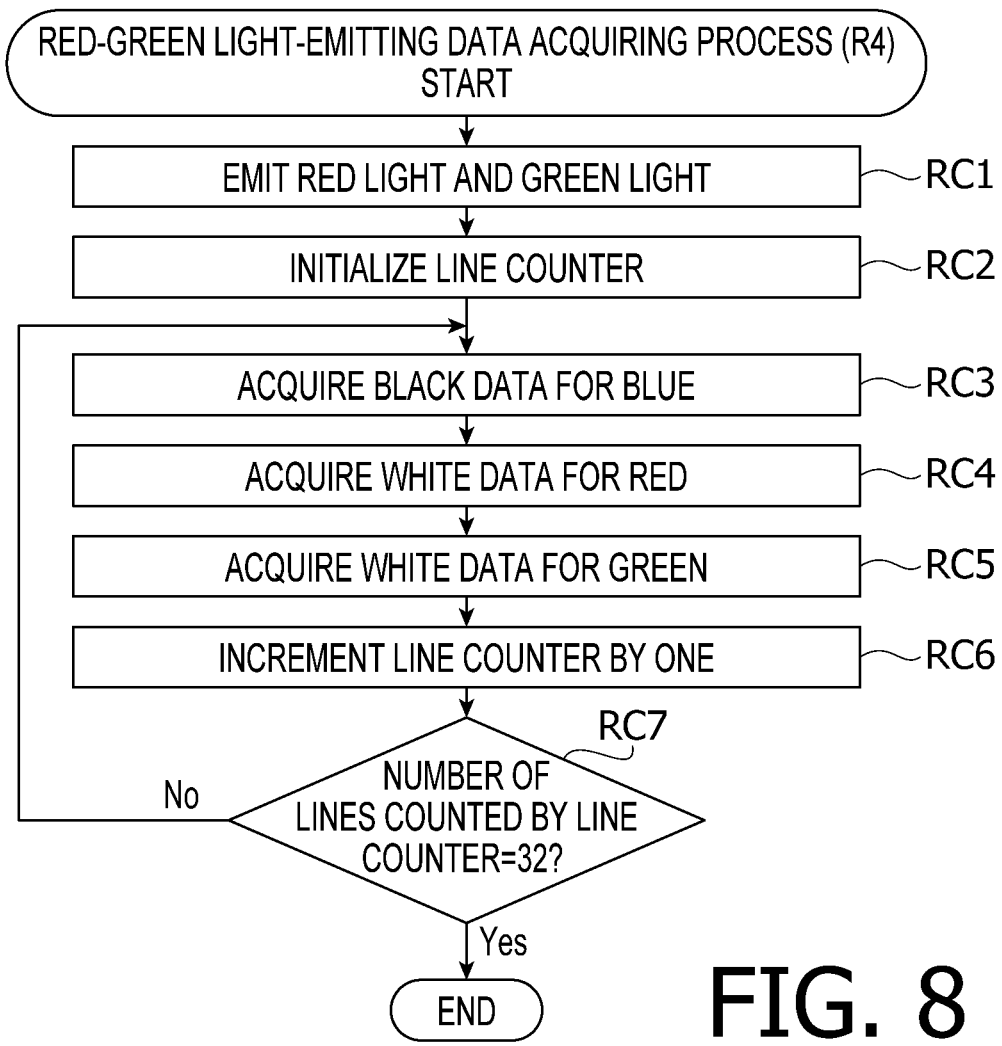
FIG. 8 is a flowchart showing a procedure of a red-green light-emitting data acquiring process of the scanning main process in the first illustrative embodiment according to one or more aspects of the present disclosure.

The red-green light-emitting data acquiring process (R4) will be described with reference to FIG. 11A. When the red-green light-emitting data acquiring process (R4) shown in FIG. 8 is started, the CPU 40 controls the light source 30 to emit red light and green light (RC1). Specifically, the CPU 40 controls the light source 30 to emit red light in the red light quantity ST in the first color period of time, to emit green light in the green light quantity ST in the second color period of time, and to be turned off during the third color period of time.

The CPU 40 initializes the line counter LC (RC2). Specifically, in response to receiving a line signal LS indicating a start of single-line scanning (see FIG. 11A), the CPU 40 sets the line counter LC to "0."

The CPU 40 acquires the black data BBK for blue (RC3). Specifically, via the initializing process in R1 and the light emitting process in RC1, the image scanning device 24 previously receives reflected light from the white reference plate 34 in a state where the light source 30 is turned off during a third color period of time. The CPU 40 acquires, as the black data BBK for blue, digital image data of each pixel of a single line within a first color period of time in which the CPU 40 controls the light source 30 to emit red light.

The CPU 40 acquires the white data RWH for red (RC4). Specifically, via the initializing process in R1 and the light emitting process in RC1, the image scanning device 24 previously receives reflected light from the white reference plate 34 in a state where the light source 30 emits red light in the red light quantity ST in the first color period of time. The CPU 40 acquires, as the white data RWH for red, digital image data of each pixel of a single line within a second color period of time.

The CPU 40 acquires the white data GWH for green (RC5). Specifically, via the initializing process in R1 and the light emitting process in RC1, the image scanning device 24 previously receives reflected light from the white reference plate 34 in a state where the light source 30 emits green light in the green light quantity ST in the second color period of time. The CPU 40 acquires, as the white data GWH for green, digital image data of each pixel of a single line within a third color period of time.

The CPU 40 increments the line counter LC by one (RC6). Specifically, in response to receiving a line signal LS indicating an end of the single-line scanning (see FIG. 11A), the CPU 40 adds "1" to the number of lines counted by the line counter LC.

The CPU 40 determines whether the number counted by the line counter LC is "32" (RC7). In response to determining that the number counted by the line counter LC is not "32" (RC7: No), the CPU 40 goes back to RC3. Meanwhile, in response to determining that the number counted by the line counter LC is "32" (RC7: Yes), the CPU 40 terminates the red-green light-emitting data acquiring process (R4). In the first illustrative embodiment, a cycle of the processes RC3 to RC7 is performed within the line period TL1.

(Red-Blue Light-Emitting Data Acquiring Process)

Figure 9:
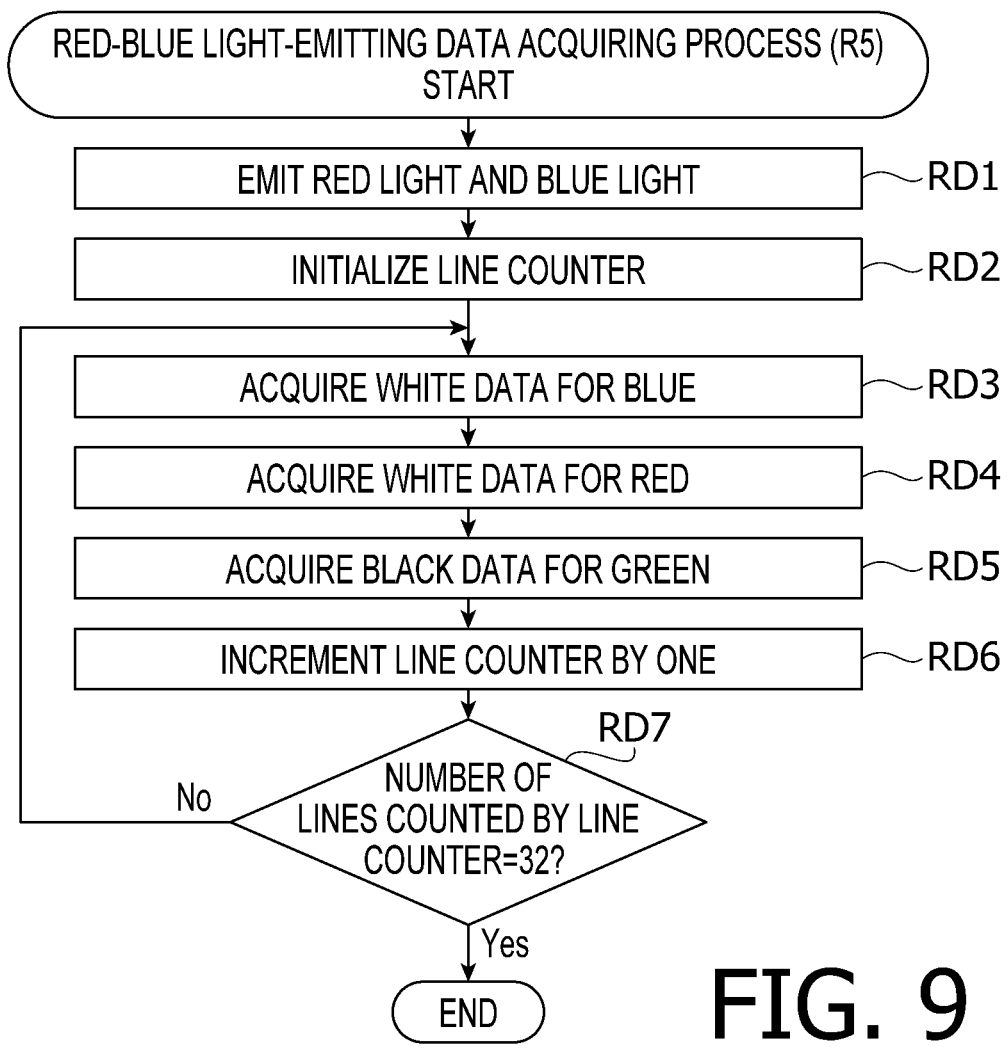
FIG. 9 is a flowchart showing a procedure of a red-blue light-emitting data acquiring process of the scanning main process in the first illustrative embodiment according to one or more aspects of the present disclosure.

The red-blue light-emitting data acquiring process (R5) will be described with reference to FIG. 11B. When the red-blue light-emitting data acquiring process (R5) shown in FIG. 9 is started, the CPU 40 controls the light source 30 to emit red light and blue light (RD1). Specifically, the CPU 40 controls the light source 30 to emit red light in the red light quantity ST in the first color period of time, to be turned off during the second color period of time, and to emit blue light in the blue light quantity ST in the third color period of time.

The CPU 40 initializes the line counter LC (RD2). Specifically, in response to receiving a line signal LS indicating a start of single-line scanning (see FIG. 11B), the CPU 40 sets the line counter LC to "0."

The CPU 40 acquires the white data BWH for blue (RD3). Specifically, via the initializing process in R1 and the light emitting process in RD1, the image scanning device 24 previously receives reflected light from the white reference plate 34 in a state where the light source 30 emits blue light in the blue light quantity ST in a third color period of time. The CPU 40 acquires, as the white data BWH for blue, digital image data of each pixel of a single line within a first color period of time.

The CPU 40 acquires the white data RWH for red (RD4). Specifically, via the initializing process in R1 and the light emitting process in RD1, the image scanning device 24 previously receives reflected light from the white reference plate 34 in a state where the light source 30 emits red light in the red light quantity ST in the first color period of time. The CPU 40 acquires, as the white data RWH for red, digital image data of each pixel of a single line within a second color period of time.

The CPU 40 acquires the black data GBK for green (RD5). Specifically, via the initializing process in R1 and the light emitting process in RD1, the image scanning device 24 previously receives reflected light from the white reference plate 34 in a state where the light source 30 is turned off during the second color period of time. The CPU 40 acquires, as the black data GBK for green, digital image data of each pixel of a single line within a third color period of time in which the CPU 40 controls the light source 30 to emit blue light.

The CPU 40 increments the line counter LC by one (RD6). Specifically, in response to receiving a line signal LS indicating an end of the single-line scanning (see FIG. 11B), the CPU 40 adds "1" to the number of lines counted by the line counter LC.

The CPU 40 determines whether the number counted by the line counter LC is "32" (RD7). In response to determining that the number counted by the line counter LC is not "32" (RD7: No), the CPU 40 goes back to RD3. Meanwhile, in response to determining that the number counted by the line counter LC is "32" (RD7: Yes), the CPU 40 terminates the red-blue light-emitting data acquiring process (R5). In the first illustrative embodiment, a cycle of the processes RD3 to RD7 is performed within the line period TL1.

(Green-Blue Light-Emitting Data Acquiring Process)

Figure 10:
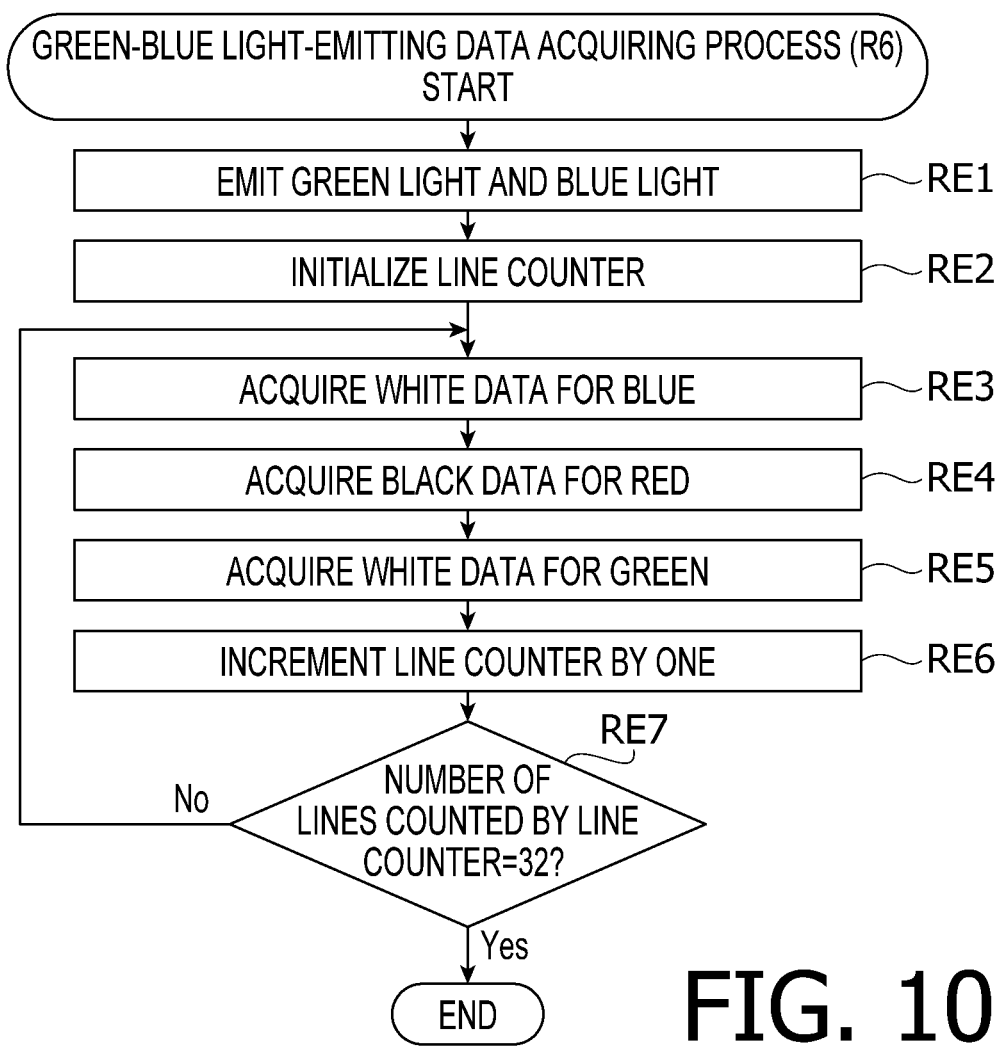
FIG. 10 is a flowchart showing a procedure of a green-blue light-emitting data acquiring process of the scanning main process in the first illustrative embodiment according to one or more aspects of the present disclosure.

The green-blue light-emitting data acquiring process (R6) will be described with reference to FIG. 11C. When the green-blue light-emitting data acquiring process (R6) shown in FIG. 10 is started, the CPU 40 controls the light source 30 to emit green light and blue light (RE1). Specifically, the CPU 40 controls the light source 30 to be turned off during the first color period of time, to emit green light in the green light quantity ST in the second color period of time, and to emit blue light in the blue light quantity ST in the third color period of time.

The CPU 40 initializes the line counter LC (RE2). Specifically, in response to receiving a line signal LS indicating a start of single-line scanning (see FIG. 11C), the CPU 40 sets the line counter LC to "0."

The CPU 40 acquires the white data BWH for blue (RE3). Specifically, via the initializing process in R1 and the light emitting process in RE1, the image scanning device 24 previously receives reflected light from the white reference plate 34 in a state where the light source 30 emits blue light in the blue light quantity ST in a third color period of time. The CPU 40 acquires, as the white data BWH for blue, digital image data of each pixel of a single line within a first color period of time.

The CPU 40 acquires the black data RBK for red (RE4). Specifically, via the initializing process in R1 and the light emitting process in RE1, the image scanning device 24 previously receives reflected light from the white reference plate 34 in a state where the light source 30 is turned off during the first color period of time. The CPU 40 acquires, as the black data RBK for red, digital image data of each pixel of a single line within a second color period of time in which the CPU 40 controls the light source 30 to emit green light.

The CPU 40 acquires the white data GWH for green (RE5). Specifically, via the initializing process in R1 and the light emitting process in RE1, the image scanning device 24 previously receives reflected light from the white reference plate 34 in a state where the light source 30 emit green light in the green light quantity ST in the second color period of time. The CPU 40 acquires, as the white data GWH for green, digital image data of each pixel of a single line within a third color period of time.

The CPU 40 increments the line counter LC by one (RE6). Specifically, in response to receiving a line signal LS indicating an end of the single-line scanning (see FIG. 11C), the CPU 40 adds "1" to the number of lines counted by the line counter LC.

The CPU 40 determines whether the number counted by the line counter LC is "32" (RE7). In response to determining that the number counted by the line counter LC is not "32" (RE7: No), the CPU 40 goes back to RE3. Meanwhile, in response to determining that the number counted by the line counter LC is "32" (RE7: Yes), the CPU 40 terminates the green-blue light-emitting data acquiring process (R6). In the first illustrative embodiment, a cycle of the processes RE3 to RE7 is performed within the line period TL1.

Second Illustrative Embodiment

A second illustrative embodiment according to aspects of the present disclosure will be described. A mechanical configuration and an electrical configuration of an image scanner 1 of the second illustrative embodiment are substantially the same as exemplified in the first illustrative embodiment. Hence, an explanation of those configurations will be omitted. In the following description, an explanation will be provided of operations by the image scanner 1 in the second illustrative embodiment.

Operations in Second Illustrative Embodiment

Operations by the image scanner 1 in the second illustrative embodiment will be described with reference to the accompanying drawings. In the following description, an explanation of substantially the same operations as exemplified in the first illustrative embodiment will be omitted. Namely, only different operations from the operations exemplified in the first illustrative embodiment will be described. Specifically, differences between the processes R1 to R9 included in the scanning main process (see FIG. 5) of the first illustrative embodiment and processes R1-1 to R9-1 included in a scanning main process of the second illustrative embodiment are as follows. The processes RC1 to RC7 in the red-green light emitting data acquiring process (R4) of the first illustrative embodiment are changed to processes RF1 to RF9 in a red-green light-emitting data acquiring process (R4-1) of the second illustrative embodiment. Further, the processes RD1 to RD7 in the red-blue light-emitting data acquiring process (R5) of the first illustrative embodiment are changed to processes RG1 to RG8 in a red-blue light-emitting data acquiring process (R5-1) of the second illustrative embodiment. Further, the processes RE1 to RE7 in the green-blue light-emitting data acquiring process (R6) of the first illustrative embodiment are changed to processes RH1 to RH9 in a green-blue light-emitting data acquiring process (R6-1) of the second illustrative embodiment. Further, the process of calculating the black reference data RFBK (R8) in the first illustrative embodiment is changed to a process of calculating black reference data RFBK (R8-1) in the second illustrative embodiment. An explanation of the other processes, which are substantially the same as exemplified in the first illustrative embodiment, will be omitted.

(Red-Green Light-Emitting Data Acquiring Process)

Figure 12:
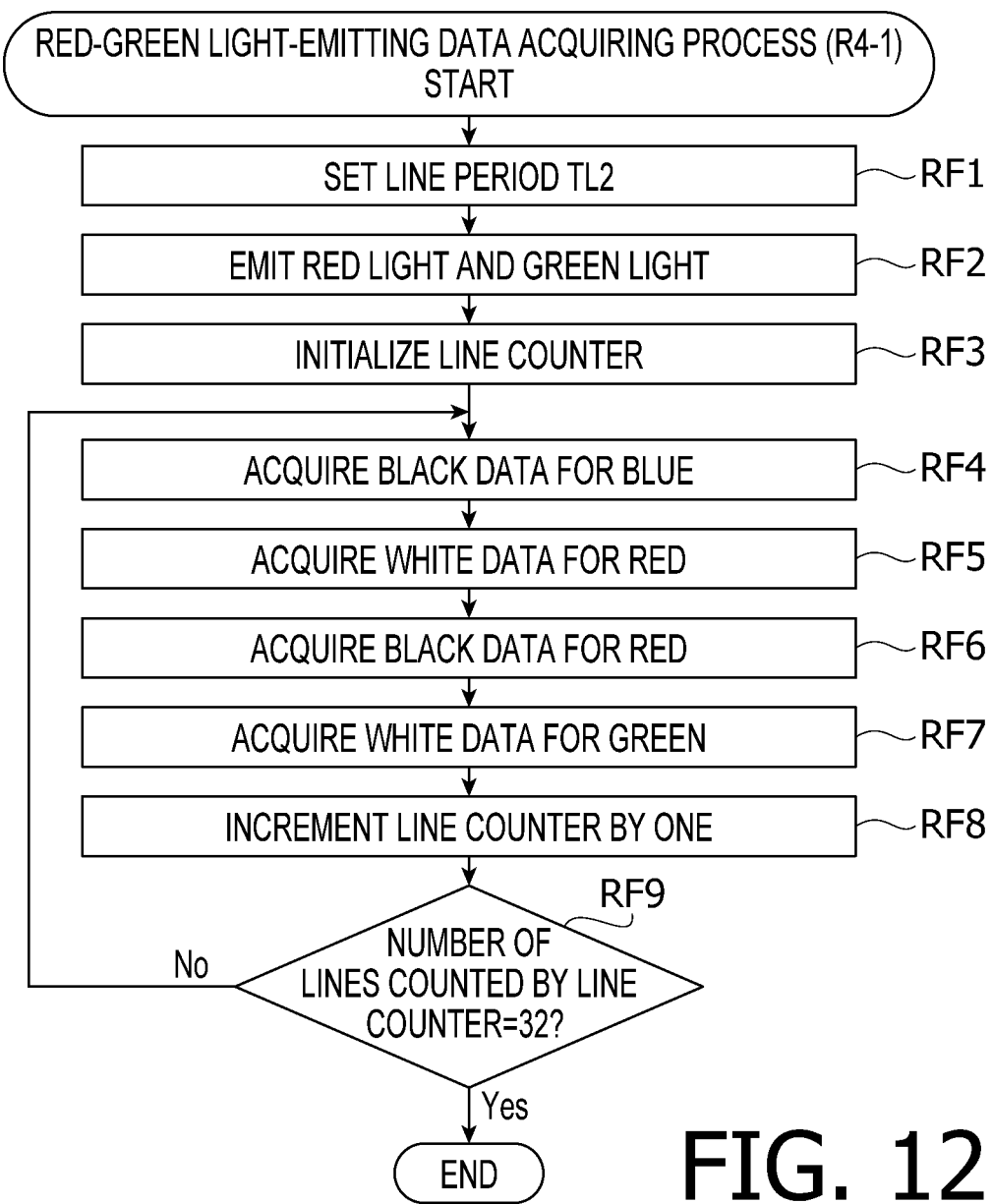
FIG. 12 is a flowchart showing a procedure of a red-green light-emitting data acquiring process of a scanning main process in a second illustrative embodiment according to one or more aspects of the present disclosure.

A red-green light-emitting data acquiring process (R4-1) will be described with reference to FIG. 15A. When the red-green light-emitting data acquiring process (R4-1) shown in FIG. 12 is started, the CPU 40 sets a line period TL2 (RF1). Specifically, the CPU 40 acquires settings regarding the serial-in signal SI from the flash PROM 43, and sets a line period TL2, which is one of the acquired settings, for the device controller 44.

Figure 15C:
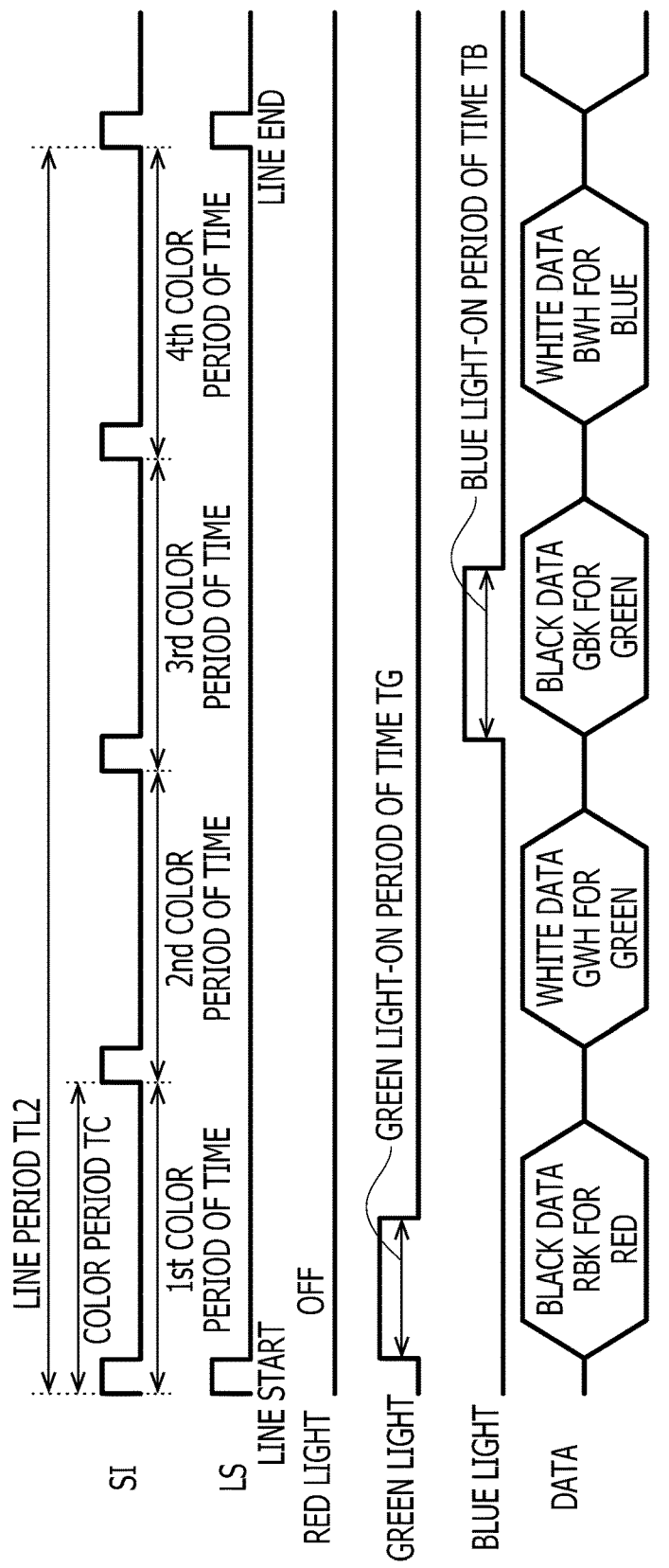
FIG. 15C is a timing chart of the green-blue light-emitting data acquiring process in the second illustrative embodiment according to one or more aspects of the present disclosure.

Referring to FIGS. 15A, 15B, and 15C, an explanation will be provided about a line period TL2 of the serial-in signal SI to be input into the image scanning device 24. In addition, an explanation will be provided about each of a first color period of time, a second color period of time, a third color period of time, and a fourth color period, each of which is a color period TC within the line period TL2. Furthermore, output timings when the image scanning device 24 outputs analog signals will be described. In the second illustrative embodiment, the line period TL2 is set to be four times as long as the color period TC. The first color period of time is a first period of time as long as the color period TC, from a start of each single-line scanning. The second color period of time is a second period of time as long as the color period TC, following the first color period of time, from the start of each single-line scanning. The third color period of time is a third period of time as long as the color period TC, following the second color period of time, from the start of each single-line scanning. The fourth color period of time is a fourth period of time as long as the color period TC, following the third color period of time, from the start of each single-line scanning. The image scanning device 24 stores electrical signals corresponding to light received in a first color period of time into the analog shift register 35, and outputs the electrical signals from the analog shift register 35 in a second color period of time. The image scanning device 24 stores electrical signals corresponding to light received in the second color period of time into the analog shift register 35, and outputs the electrical signals from the analog shift register 35 in a third color period of time. The image scanning device 24 stores electrical signals corresponding to light received in the third color period of time into the analog shift register 35, and outputs the electrical signals from the analog shift register 35 in a fourth color period of time. The image scanning device 24 stores electrical signals corresponding to light received in the fourth color period of time into the analog shift register 35, and outputs the electrical signals from the analog shift register 35 in a first color period of time. In the first illustrative embodiment, an end time of a line is coincident with a start time of a next line.

The CPU 40 controls the light source 30 to emit red light and green light (RF2). Specifically, the CPU 40 controls the light source 30 to emit red light in the red light quantity ST in the first color period of time, to be turned off during the second color period of time, to emit green light in the green light quantity ST in the third color period of time, and to be turned off during the fourth color period of time.

The CPU 40 initializes the line counter LC (RF3). Specifically, in response to receiving a line signal LS indicating a start of single-line scanning (see FIG. 15A), the CPU 40 sets the line counter LC to "0."

The CPU 40 acquires the black data BBK for blue (RF4). Specifically, via the initializing process in R1 and the light emitting process in RF2, the image scanning device 24 previously receives reflected light from the white reference plate 34 in a state where the light source 30 is turned off during a fourth color period of time. The CPU 40 acquires, as the black data BBK for blue, digital image data of each pixel of a single line within a first color period of time in which the CPU 40 controls the light source 30 to emit red light. As shown in FIG. 16, when blue image data is output in the image scanning process, the light source 30 emits red light. Hence, in the red-green light-emitting data acquiring process (R4-1), data output when the light source 30 emit red light is acquired as black data for blue.

The CPU 40 acquires the white data RWH for red (RF5). Specifically, via the initializing process in R1 and the light emitting process in RF2, the image scanning device 24 previously receives reflected light from the white reference plate 34 in a state where the light source 30 emits red light in the red light quantity ST in the first color period of time. The CPU 40 acquires, as the white data RWH for red, digital image data of each pixel of a single line within a second color period of time.

The CPU 40 acquires the black data RBK for red (RF6). Specifically, via the initializing process in R1 and the light emitting process in RF2, the image scanning device 24 previously receives reflected light from the white reference plate 34 in a state where the light source 30 is turned off during the second color period of time. The CPU 40 acquires, as the black data RBK for red, digital image data of each pixel of a single line within a third color period of time in which the light source 30 emits green light. As shown in FIG. 16, when red image data is output in the image scanning process, the light source 30 emits green light. Hence, in the red-green light-emitting data acquiring process (R4-1), data output when the light source 30 emit green light is acquired as black data for red.

The CPU 40 acquires the white data GWH for green (RF7). Specifically, via the initializing process in R1 and the light emitting process in RF2, the image scanning device 24 previously receives reflected light from the white reference plate 34 in a state where the light source 30 emits green light in the green light quantity ST in the third color period of time. The CPU 40 acquires, as the white data GWH for green, digital image data of each pixel of a single line within a fourth color period of time.

The CPU 40 increments the line counter LC by one (RF8). Specifically, in response to receiving a line signal LS indicating an end of the single-line scanning (see FIG. 15A), the CPU 40 adds "1" to the number of lines counted by the line counter LC.

The CPU 40 determines whether the number counted by the line counter LC is "32" (RF9). In response to determining that the number counted by the line counter LC is not "32" (RF9: No), the CPU 40 goes back to RF4. Meanwhile, in response to determining that the number counted by the line counter LC is "32" (RF9: Yes), the CPU 40 terminates the red-green light-emitting data acquiring process (R4-1). In the second illustrative embodiment, a cycle of the processes RF4 to RF9 is performed within the line period TL2.

(Red-Blue Light-Emitting Data Acquiring Process)

Figure 13:
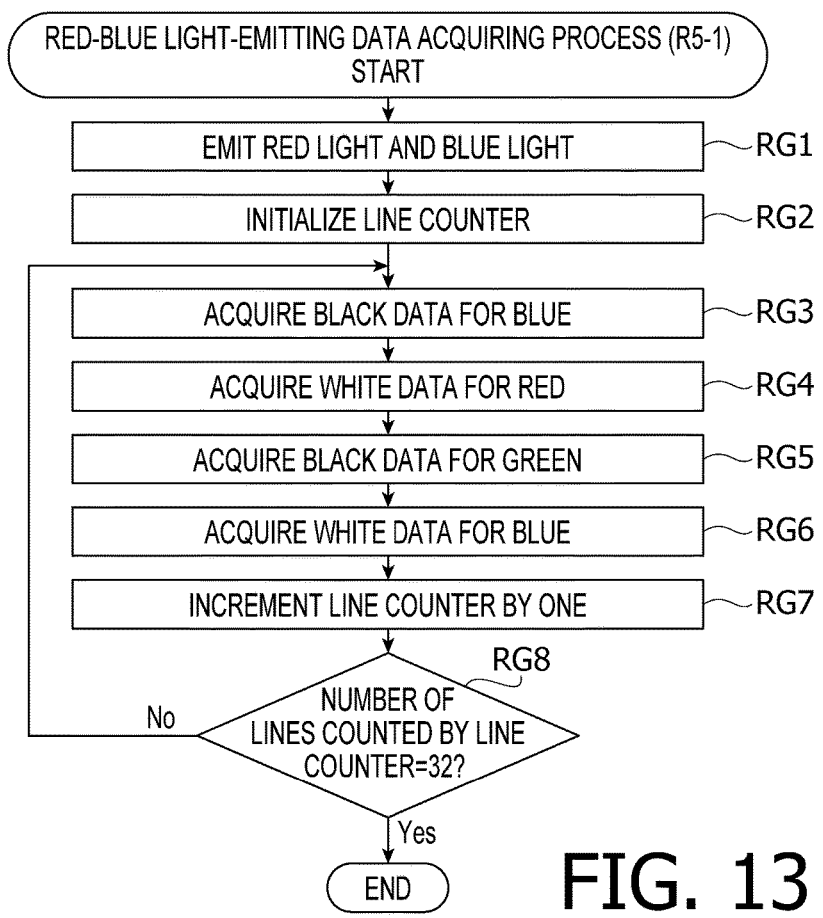
FIG. 13 is a flowchart showing a procedure of a red-blue light-emitting data acquiring process of the scanning main process in the second illustrative embodiment according to one or more aspects of the present disclosure.

The red-blue light-emitting data acquiring process (R5-1) will be described with reference to FIG. 15B. When the red-blue light-emitting data acquiring process (R5-1) shown in FIG. 13 is started, the CPU 40 controls the light source 30 to emit red light and blue light (RG1). Specifically, the CPU 40 controls the light source 30 to emit red light in the red light quantity ST in the first color period of time, to be turned off during the second color period of time, to emit blue light in the blue light quantity ST in the third color period of time, and to be turned off during the fourth color period of time.

The CPU 40 initializes the line counter LC (RG2). Specifically, in response to receiving a line signal LS indicating a start of single-line scanning (see FIG. 15B), the CPU 40 sets the line counter LC to "0."

The CPU 40 acquires the black data BBK for blue (RG3). Specifically, via the initializing process in R1 and the light emitting process in RG1, the image scanning device 24 previously receives reflected light from the white reference plate 34 in a state where the light source 30 is turned off during a fourth color period of time. The CPU 40 acquires, as the black data BBK for blue, digital image data of each pixel of a single line within a first color period of time.

The CPU 40 acquires the white data RWH for red (RG4). Specifically, via the initializing process in R1 and the light emitting process in RG1, the image scanning device 24 previously receives reflected light from the white reference plate 34 in a state where the light source 30 emits red light in the red light quantity ST in the first color period of time. The CPU 40 acquires, as the white data RWH for red, digital image data of each pixel of a single line within a second color period of time.

The CPU 40 acquires the black data GBK for green (RG5). Specifically, via the initializing process in R1 and the light emitting process in RG1, the image scanning device 24 previously receives reflected light from the white reference plate 34 in a state where the light source 30 is turned off during the second color period of time. The CPU 40 acquires, as the black data GBK for green, digital image data of each pixel of a single line within a third color period of time in which the CPU 40 controls the light source 30 to emit blue light. As shown in FIG. 16, when green image data is output in the image scanning process, the light source 30 emits blue light. Hence, in the red-blue light-emitting data acquiring process (R5-1), data output when the light source 30 emit blue light is acquired as black data for green.

The CPU 40 acquires the white data BWH for blue (RG6). Specifically, via the initializing process in R1 and the light emitting process in RG1, the image scanning device 24 previously receives reflected light from the white reference plate 34 in a state where the light source 30 emits blue light in the blue light quantity ST in the third color period of time. The CPU 40 acquires, as the white data BWH for blue, digital image data of each pixel of a single line within a fourth color period of time.

The CPU 40 increments the line counter LC by one (RG7). Specifically, in response to receiving a line signal LS indicating an end of the single-line scanning (see FIG. 15B), the CPU 40 adds "1" to the number of lines counted by the line counter LC.

The CPU 40 determines whether the number counted by the line counter LC is "32" (RG8). In response to determining that the number counted by the line counter LC is not "32" (RG8: No), the CPU 40 goes back to RG3. Meanwhile, in response to determining that the number counted by the line counter LC is "32" (RG8: Yes), the CPU 40 terminates the red-blue light-emitting data acquiring process (R5-1). In the second illustrative embodiment, a cycle of the processes RG3 to RG8 is performed within the line period TL2.

(Green-Blue Light-Emitting Data Acquiring Process)

Figure 14:
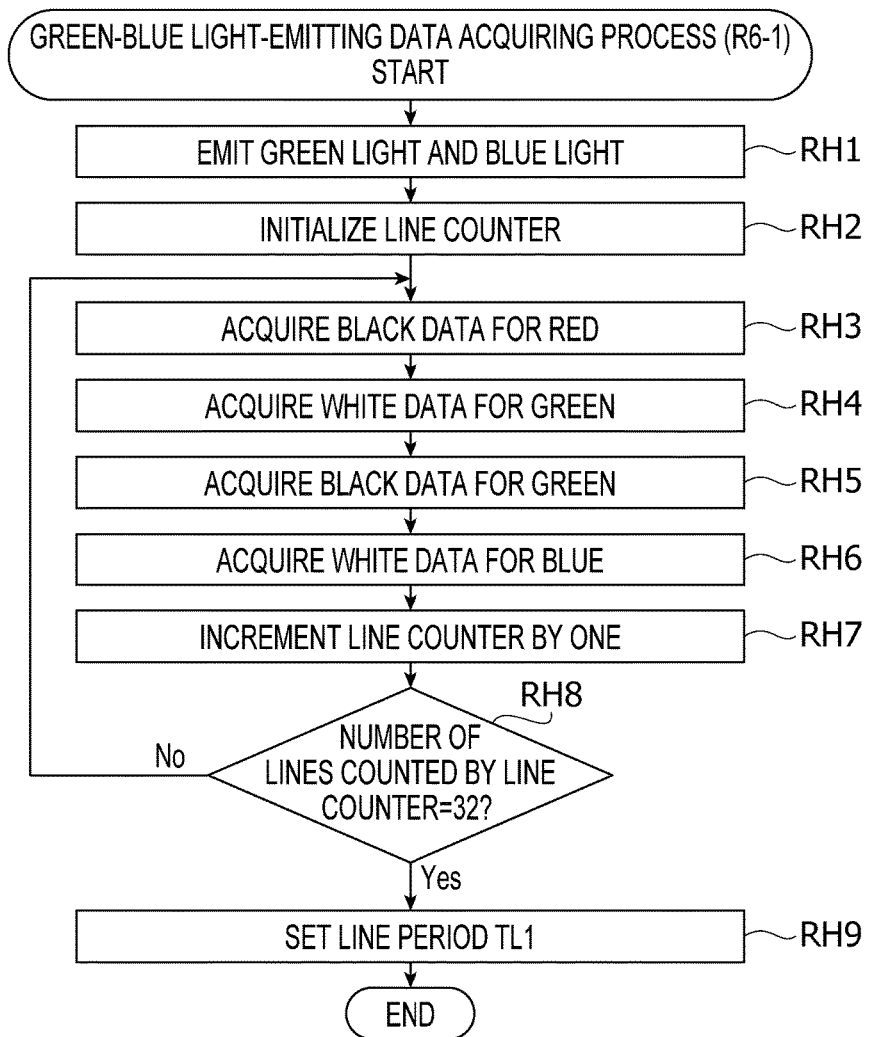
FIG. 14 is a flowchart showing a procedure of a green-blue light-emitting data acquiring process of the scanning main process in the second illustrative embodiment according to one or more aspects of the present disclosure.

The green-blue light-emitting data acquiring process (R6-1) will be described with reference to FIG. 15C. When the green-blue light-emitting data acquiring process (R6-1) shown in FIG. 14 is started, the CPU 40 controls the light source 30 to emit green light and blue light (RH1). Specifically, the CPU 40 controls the light source 30 to emit green light in the green light quantity ST in the first color period of time, to be turned off during the second color period of time, to emit blue light in the blue light quantity ST in the third color period of time, and to be turned off during the fourth color period of time.

The CPU 40 initializes the line counter LC (RH2). Specifically, in response to receiving a line signal LS indicating a start of single-line scanning (see FIG. 15C), the CPU 40 sets the line counter LC to "0."

The CPU 40 acquires the black data RBK for red (RH3). Specifically, via the initializing process in R1 and the light emitting process in RH1, the image scanning device 24 previously receives reflected light from the white reference plate 34 in a state where the light source 30 is turned off during a fourth color period of time. The CPU 40 acquires, as the black data RBK for red, digital image data of each pixel of a single line within a first color period of time in which the light source 30 emits green light.

The CPU 40 acquires the white data GWH for green (RH4). Specifically, via the initializing process in R1 and the light emitting process in RH1, the image scanning device 24 previously receives reflected light from the white reference plate 34 in a state where the light source 30 emits green light in the green light quantity ST in the first color period of time. The CPU 40 acquires, as the white data GWH for green, digital image data of each pixel of a single line within a second color period of time.

The CPU 40 acquires the black data GBK for green (RH5). Specifically, via the initializing process in R1 and the light emitting process in RH1, the image scanning device 24 previously receives reflected light from the white reference plate 34 in a state where the light source 30 is turned off during the second color period of time. The CPU 40 acquires, as the black data GBK for green, digital image data of each pixel of a single line within a third color period of time in which the light source 30 emits blue light.

The CPU 40 acquires the white data BWH for blue (RH6). Specifically, via the initializing process in R1 and the light emitting process in RH1, the image scanning device 24 previously receives reflected light from the white reference plate 34 in a state where the light source 30 emits blue light in the blue light quantity ST in the third color period of time. The CPU 40 acquires, as the white data BWH for blue, digital image data of each pixel of a single line within a fourth color period of time.

The CPU 40 increments the line counter LC by one (RH7). Specifically, in response to receiving a line signal LS indicating an end of the single-line scanning (see FIG. 15C), the CPU 40 adds "1" to the number of lines counted by the line counter LC.

The CPU 40 determines whether the number counted by the line counter LC is "32" (RH8). In response to determining that the number counted by the line counter LC is not "32" (RH8: No), the CPU 40 goes back to RH3. Meanwhile, in response to determining that the number counted by the line counter LC is "32" (RH8: Yes), the CPU 40 goes to RH9. In the second illustrative embodiment, a cycle of the processes RH3 to RH8 is performed within the line period TL2.

The CPU 40 sets a line period TL1 (RH9). Specifically, the CPU 40 acquires settings regarding the serial-in signal SI from the flash PROM 43, and sets a line period TL1, which is one of the acquired settings, for the device controller 44. The line period TL1 of the serial-in signal SI is set to be three times as long as the color period TC in the same manner as exemplified in the first illustrative embodiment. After execution of RH9, the CPU 40 terminates the green-blue light-emitting data acquiring process (R6-1).

Subsequently, an explanation will be provided about a black reference data calculating process (R8-1) to calculate black reference data RFBK in the second illustrative embodiment. In the second illustrative embodiment, when the black reference data calculating process (R8-1) is started, the CPU 40 calculates the black reference data RFBK. Specifically, the CPU 40 calculates black reference data RFBK for red by averaging all of the black data RBK for red (i.e., 64 lines of black data RBK for red in total) acquired in the processes R4-1 and R6-1, with respect to each pixel of the single line. The CPU 40 calculates black reference data RFBK for blue by averaging all of the black data BBK for blue (i.e., 64 lines of black data BBK for blue in total) acquired in the processes R4-1 and R5-1, with respect to each pixel of the single line. The CPU 40 calculates black reference data RFBK for green by averaging all of the black data GBK for green (i.e., 64 lines of black data GBK for green in total) acquired in the processes R5-1 and R6-1, with respect to each pixel of the single line. The black reference data RFBK includes the black reference data RFBK for red, the black reference data RFBK for blue, black reference data RFBK for green.

Advantageous Effects of Illustrative Embodiments

In the first illustrative embodiment, in the light-on period adjusting process (R3) of the scanning main process, the CPU 40 adjusts the red light-on period of time TR, the green light-on period of time TG, and the blue light-on period of time TB in such a manner that signal levels of analog signals output from the image scanning device 24 receiving reflected light from the white reference plate 34 are substantially equal to the maximum value of the input range of the AFE 45. In the red-green light-emitting data acquiring process (R4), the CPU 40 controls the light source 30 to emit red light and acquires the black data BBK for blue in the first color period of time, controls the light source 30 emit green light and acquires the white data RWH for red in the second color period of time, and controls the light source 30 to be turned off and acquires the white data GWH for green in the third color period of time. In the red-blue light-emitting data acquiring process (R5), the CPU 40 controls the light source 30 to emit red light and acquires the white data BWH for blue in the first color period of time, controls the light source 30 to be turned off and acquires the white data RWH for red in the second color period of time, and controls the light source 30 to emit blue light and acquires the black data GBK for green in the third color period of time. In the green-blue light-emitting data acquiring process (R6), the CPU 40 controls the light source 30 to be turned off and acquires the white data BWH for blue in the first color period of time, controls the light source 30 to emit green light and acquires the black data RBK for red in the second color period of time, and controls the light source 30 to emit blue light and acquires the white data GWH for green in the third color period of time. In the white reference data calculating process (R7), the CPU 40 calculates the white reference data RFWH for red by averaging all of the acquired white data RWH for red with respect to each pixel of the single line, calculates the white reference data RFWH for green by averaging all of the acquired white data GWH for green with respect to each pixel of the single line, and calculates the white reference data RFWH for blue by averaging all of the acquired white data BWH for blue with respect to each pixel of the single line. In the black reference data calculating process (R8), the CPU 40 calculates the black reference data RFBK for red by averaging all of the acquired black data RBK for red with respect to each pixel of the single line, calculates the black reference data RFBK for green by averaging all of the acquired black data GBK for green with respect to each pixel of the single line, and calculates the black reference data RFBK for blue by averaging all of the acquired black data BBK for blue with respect to each pixel of the single line. In the image scanning process (R9), the CPU 40 performs black correction for the scanned digital data based on the black reference data RFBK with respect to each of the three colors, and performs white correction for the black-corrected digital data based on the white reference data RFWH with respect to each of the three colors. Thus, the CPU 40 controls the light source 30 emit red light when acquiring the black data BBK for blue, controls the light source 30 emit blue light when acquiring the black data GBK for green, and controls the light source 30 emit green light when acquiring the black data RBK for red. Therefore, even when black data differs depending on the three colors of light to be individually emitted by the light source 30, the CPU 40 calculates the black reference data RFBK for each color, based on the back data for each color. Thereby, it is possible to accurately calculate the black reference data RFBK, and to achieve highly accurate black correction.

In the second illustrative embodiment, in the red-green light-emitting data acquiring process (R4-1), the CPU 40 sets the line period TL2 to be four times as long as the color period TC. Further, in the process R4-1, the CPU 40 controls the light source 30 to emit red light and acquires the black data BBK for blue in the first color period of time, controls the light source 30 to be turned off and acquires the white data RWH for red in the second color period of time, controls the light source 30 to emit green light and acquires the black data RBK for red in the third color period of time, and controls the light source 30 to be turned off and acquires the white data GWH for green in the fourth color period of time. In the red-blue light-emitting data acquiring process (R5-1), the CPU 40 controls the light source 30 to emit red light and acquires the black data BBK for blue in the first color period of time, controls the light source 30 to be turned off and acquires the white data RWH for red in the second color period of time, controls the light source 30 to emit blue light and acquires the black data GBK for green in the third color period of time, and controls the light source 30 to be turned off and acquires the white data BWH for blue in the fourth color period of time. In the green-blue light-emitting data acquiring process (R6-1), the CPU 40 controls the light source 30 to emit green light and acquires the black data RBK for red in the first color period of time, controls the light source 30 to be turned off and acquires the white data GWH for green in the second color period of time, controls the light source 30 to emit blue light and acquires the black data GBK for green in the third color period of time, and controls the light source 30 to be turned off and acquires the white data BWH for blue in the fourth color period of time. In the black reference data calculating process (R8-1), the CPU 40 calculates the black reference data RFBK for red by averaging all of the acquired black data RBK for red with respect to each pixel of the single line, calculates the black reference data RFBK for green by averaging all of the acquired black data GBK for green with respect to each pixel of the single line, and calculates the black reference data RFBK for blue by averaging all of the acquired black data BBK for blue with respect to each pixel of the single line. In the image scanning process (R9-1), the CPU 40 performs black correction for the scanned digital data based on the black reference data RFBK with respect to each of the three colors, and performs white correction for the black-corrected digital data based on the white reference data RFWH with respect to each of the three colors. Thus, the CPU 40 controls the light source 30 emit red light when acquiring the black data BBK for blue, controls the light source 30 emit blue light when acquiring the black data GBK for green, and controls the light source 30 emit green light when acquiring the black data RBK for red. Therefore, even when black data differs depending on the three colors of light to be individually emitted by the light source 30, the CPU 40 calculates the black reference data RFBK for each color, based on the back data for each color. Thereby, it is possible to accurately calculate the black reference data RFBK, and to achieve highly accurate black correction. Furthermore, since the line period TL2 is set to be four times as long as the color period TC, it is possible to acquire black data for two colors and white data for two colors within the line period TL2. Thus, in the second illustrative embodiment, it is possible to acquire black data for each color and white data for each color in a shorter period of time than when black data and white data are acquired using the line period TL1 as exemplified in the first illustrative embodiment.

With respect to associations of elements exemplified in the aforementioned illustrative embodiments with elements to be defined according to aspects of the present disclosure, the image scanner 1 may be an example of an image scanner according to aspects of the present disclosure. The white reference plate 34 may be an example of a reference member according to aspects of the present disclosure. A combination including the image scanning device 24 and the AFE 45 may be an example of an image scanning device according to aspects of the present disclosure. The image processor 46 may be an example of a corrector according to aspects of the present disclosure. The CPU 40 executing the programs 41A stored in the ROM 41 may be an example of a controller according to aspects of the present disclosure. A combination including the processes R2 and R3 may be an example of a light-source adjusting process according to aspects of the present disclosure. A combination including the processes RC3, RD5, and RE4 may be an example of a black data acquiring process according to aspects of the present disclosure. The process R8 may be an example of a black correction data calculating process according to aspects of the present disclosure. A combination including the processes RC4, RC5, RD3, RD4, RE3, and RE5 may be an example of a white data acquiring process according to aspects of the present disclosure. The process R7 may be an example of a white correction data calculating process according to aspects of the present disclosure.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modifications]

Aspects of the present disclosure may be applied to a multi-function peripheral having a printer as well as an image scanner. In the aforementioned illustrative embodiments, the image scanner 1 includes the single image scanning device 24 and the single white reference plate 34. However, in order to scan both sides of a document sheet GS, the image scanner 1 may include two image scanning devices and two white reference plates.

In the aforementioned illustrative embodiments, all processes of the scanning main process shown in FIG. 5 are performed by the CPU 40. However, for instance, a part of the processes R2 to R9 (or the processes R2-1 to R9-1) of the scanning main process may be performed by the image processor 46, the device controller 44, or the AFE 45.

In the aforementioned illustrative embodiments, the light source 30 includes the single three-color LED chip having three LEDs each of which is configured to emit light of a specific color of the three colors. However, the light source 30 may include three LED chips each of which is configured to emit light of a specific color of the three colors. Alternatively, the light source 30 may include a single one-color LED chip for a specific color and a single two-color LED chip having two LEDs for the other two colors.

In the aforementioned illustrative embodiments, in the image scanning process, the light source 30 is controlled to emit red light in the first color period of time, emit green light in the second color period of time, and emit blue light in the third color period of time. However, a sequence for the light source 30 to sequentially emit light of each of the three colors is not limited to the above sequence. For instance, the light source 30 may emit blue light or green light in the first color period of time, emit red light or blue light in the second color period of time, and emit red light or green light in the third color period of time. Namely, the light source 30 may emit light of each of the three colors in an arbitrary sequence in a specific one of the first to third color periods of time.

In the aforementioned illustrative embodiments, a light quantity when the light source 30 is controlled to emit light of each color with the light-source current LI adjusted in the process R2 (or R2-1), during the specific light-on period of time adjusted for each color in the process R3 (or R3-1) is the specific light quantity ST for each color. However, the respective light quantities ST (i.e., the red light quantity ST, the green light quantity ST, and the blue light quantity ST) for the three colors may be the same light quantity.

In the aforementioned illustrative embodiments, the CPU 40 acquires white data and black date in a single line period. However, the CPU 40 may acquire white data and black data in discrete line periods, respectively.

In the aforementioned second illustrative embodiment, each of the processes RF9, RG8, and RH8 is repeatedly performed until the number counted by the line counter LC is "32." However, in order to calculate the black reference data RFBK based on 32 lines of black data for each color in the same manner as exemplified in the aforementioned first illustrative embodiment, each of the processes RF9, RG8, and RH8 may be repeatedly performed until the number counted by the line counter LC is "16."

In the aforementioned first illustrative embodiment, in the process R7, the white reference data RFWH for red is calculated by averaging all of the white data RWH for red (i.e., 64 lines of white data RWH for red in total) acquired in the processes R4 and R5. However, in the process R7, the white reference data RFWH for red may be calculated by averaging the 32 lines of white data RWH for red acquired in the process R4. Likewise, the white reference data RFWH for blue may be calculated by averaging the 32 lines of white data BWH for blue acquired in the process R5.

What is claimed is:

1. An image scanner comprising:
    an image scanning device comprising:
        a light source configured to emit light of each of a plurality of colors;
        a predetermined number of light receiving elements arranged in line along a particular scanning direction, each light receiving element being configured to output read data corresponding to a quantity of light received by each light receiving element; and
        a shift register having a plurality of registers each connected with a corresponding one of the light receiving elements, the shift register being configured to output a plurality of pieces of image data corresponding to the plurality of pieces of read data output from the predetermined number of light receiving elements, respectively, a number of the plurality of pieces of read data and a number of the plurality of pieces of image data being equal to the predetermined number;
    a corrector configured to acquire a plurality of pieces of black-corrected image data by performing black correction for the plurality of pieces of image data output from the image scanning device, based on a plurality of pieces of black correction data, respectively, a number of the plurality of pieces of black-corrected image data and a number of the plurality of pieces of black correction data being equal to the predetermined number; and a controller configured to:
perform a light-source adjusting process comprising:
adjusting a light quantity of light of each color to be emitted by the light source, in such a manner that a maximum value of a plurality of pieces of image data of each color output from the image scanning device is a particular value;
perform black data acquiring process for each of the plurality of colors, the black data acquiring process for an individual particular color comprising:
controlling the light source to emit light of each color of the plurality of colors onto an object in the adjusted light quantity for each color in a specific period of time for each color, and to be turned off in a particular period of time;
in the particular period of time, while controlling the light source to be turned off, controlling each of the light receiving elements to read an image of the object and transmit read data of the object to the shift register; and
in a specific period of time next to the particular period of time, controlling the light source to emit light of a predetermined color different from the particular color, and controlling the shift register to output a plurality of pieces of image data of the object as a plurality of pieces of black data for the particular color, the plurality of pieces of image data corresponding to the plurality of pieces of read data of the object transmitted by the predetermined number of light receiving elements, respectively; and
perform black correction data calculating process comprising:
calculating a plurality of pieces of black correction data for each color, based on the plurality of pieces of black data for each color, respectively.

2. The image scanner according to claim 1, further comprising reference member disposed to face the image scanning device,
wherein the corrector is further configured to perform white correction for the plurality of pieces of black-corrected image data,
wherein the controller is further configured to:
perform a white data acquiring process for each of the plurality of colors, the white data acquiring process for an individual specific color comprising:
controlling the light source to emit light of each color of the plurality of colors onto the reference member in the adjusted light quantity for each color in the specific period of time for each color, and to be turned off in the particular period of time;
in a specific period of time for the specific color, while controlling the light source to emit light of the specific color onto the reference member, controlling each of the light receiving elements to read an image of the reference member with the emitted light of the specific color and transmit read data of the reference member to the shift register; and
in a period of time next to the specific period of time, controlling the light source to be turned off or emit light of a predetermined color different from the specific color, and controlling the shift register to output a plurality of pieces of image data of the reference member as a plurality of pieces of white data for the specific color, the plurality of pieces of image data corresponding to the plurality of pieces of read data of the reference member transmitted by the predetermined number of light receiving elements, respectively; and
perform white correction data calculating process comprising:
calculating a plurality of pieces of white correction data for each color, based on the plurality of pieces of white data for each color, respectively.

3. The image scanner according to claim 2,
wherein the light source is further configured to emit red light, green light, and blue light,
wherein the controller is further configured to:
perform a first scanning process to scan three lines of the image of the reference member at intervals of a first specific line period, the first scanning process comprising:
in a first specific period of time within the first specific line period, while controlling the light source to emit red light onto the reference member in an adjusted light quantity for red light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the red light emitted by the light source;
in a second specific period of time within the first specific line period, while controlling the light source to emit green light onto the reference member in an adjusted light quantity for green light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the green light emitted by the light source; and
in a third specific period of time within the first specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source;
perform a second scanning process to scan three lines of the image of the reference member at intervals of a second specific line period, the second scanning process comprising:
in a first specific period of time within the second specific line period, while controlling the light source to emit red light onto the reference member in the adjusted light quantity for red light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the red light emitted by the light source;

in a second specific period of time within the second specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source; and in a third specific period of time within the second specific line period, while controlling the light source to emit blue light in an adjusted light quantity for blue light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the blue light emitted by the light source;

perform a third scanning process to scan three lines of the image of the reference member at intervals of a third specific line period, the third scanning process comprising:

in a first specific period of time within the third specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source;

in a second specific period of time within the third specific line period, while controlling the light source to emit green light in the adjusted light quantity for green light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the green light emitted by the light source; and in a third specific period of time within the third specific line period, while controlling the light source to emit blue light in the adjusted light quantity for blue light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the blue light emitted by the light source; and perform a document scanning process to scan three lines of an image of a document at intervals of a particular line period, the document scanning process comprising:

in a first specific period of time within the particular line period, while controlling the light source to emit red light in the adjusted light quantity for red light, controlling the predetermined number of light receiving elements to scan a single line of the image of the reference member and transmit scanned line data of the reference member to the shift register, the scanned line data comprising a plurality of pieces of read data of the document that have been taken by the predetermined number of light receiving elements, respectively, with the red light emitted by the light source;

in a second specific period of time within the particular line period, while controlling the light source to emit green light in the adjusted light quantity for green light, controlling the predetermined number of light receiving elements to scan a single line of the image of the reference member and transmit scanned line data of the reference member to the shift register, the scanned line data comprising a plurality of pieces of read data of the document that have been taken by the predetermined number of light receiving elements, respectively, with the green light emitted by the light source; and in a third specific period of time within the particular line period, while controlling the light source to emit blue light in the adjusted light quantity for blue light, controlling the predetermined number of light receiving elements to scan a single line of the image of the reference member and transmit scanned line data of the reference member to the shift register, the scanned line data comprising a plurality of pieces of read data of the document that have been taken by the predetermined number of light receiving elements, respectively, with the blue light emitted by the light source, wherein the black data acquiring process for each color comprises:

acquiring a plurality of lines of black data for blue by repeating the first scanning process a plurality of times, each single line of black data for blue comprising a plurality of pieces of black data for blue corresponding to the plurality of pieces of read data of the reference member that have been taken by the predetermined number of light receiving elements, respectively, with no light emitted by the light source in the third specific period of time in the first scanning process, each single line of black data for blue being output from the shift register in the first specific period of time in the first scanning process;

acquiring a plurality of lines of black data for green by repeating the second scanning process a plurality of times, each single line of black data for green comprising a plurality of pieces of black data for green corresponding to the plurality of pieces of read data of the reference member that have been taken by the predetermined number of light receiving elements, respectively, with no light emitted by the light source in the second specific period of time in the second scanning process, each single line of black data for green being output from the shift register in the third specific period of time in the second scanning process; and acquiring a plurality of lines of black data for red by repeating the third scanning process a plurality of times, each single line of black data for red comprising a plurality of pieces of black data for red corresponding to the plurality of pieces of read data of the reference member that have been taken by the predetermined number of light receiving elements, respectively, with no light emitted by the light source in the first specific period of time in the third scanning process, each single line of black data for red being output from the shift register in the second specific period of time in the third scanning process and wherein the white data acquiring process for each color comprises:

acquiring a plurality of lines of white data for red and a plurality of lines of white data for green by repeating the first scanning process a plurality of times, each single line of white data for red comprising a plurality of pieces of white data for red corresponding to the plurality of pieces of read data of the reference member that have been taken by the predetermined number of light receiving elements, respectively, with the red light emitted by the light source in the first specific period of time in the first scanning process, each single line of white data for red being output from the shift register in the second specific period of time in the first scanning process, each single line of white data for green comprising a plurality of pieces of white data for green corresponding to the plurality of pieces of read data of the reference member that have been taken by the predetermined number of light receiving elements, respectively, with the green light emitted by the light source in the second specific period of time in the first scanning process, each single line of white data for green being output from the shift register in the third specific period of time in the first scanning process;

acquiring a plurality of lines of white data for red and a plurality of lines of white data for blue by repeating the second scanning process a plurality of times, each single line of white data for red comprising a plurality of pieces of white data for red corresponding to the plurality of pieces of read data of the reference member that have been taken by the predetermined number of light receiving elements, respectively, with the red light emitted by the light source in the first specific period of time in the second scanning process, each single line of white data for red being output from the shift register in the second specific period of time in the second scanning process, each single line of white data for blue comprising a plurality of pieces of white data for blue corresponding to the plurality of pieces of read data of the reference member that have been taken by the predetermined number of light receiving elements, respectively, with the blue light emitted by the light source in the third specific period of time in the second scanning process, each single line of white data for blue being output from the shift register in the first specific period of time in the second scanning process; and acquiring a plurality of lines of white data for green and a plurality of lines of white data for blue by repeating the third scanning process a plurality of times, each single line of white data for green comprising a plurality of pieces of white data for green corresponding to the plurality of pieces of read data of the reference member that have been taken by the predetermined number of light receiving elements, respectively, with the green light emitted by the light source in the second specific period of time in the third scanning process, each single line of white data for green being output from the shift register in the third specific period of time in the third scanning process, each single line of white data for blue comprising a plurality of pieces of white data for blue corresponding to the plurality of pieces of read data of the reference member that have been taken by the predetermined number of light receiving elements, respectively, with the blue light emitted by the light source in the third specific period of time in the third scanning process, each single line of white data for blue being output from the shift register in the first specific period of time in the third scanning process.

4. The image scanner according to claim 2, wherein the light source is further configured to emit red light, green light, and blue light, wherein the controller is further configured to:

perform a first scanning process to scan four lines of the image of the reference member at intervals of a first specific line period, the first scanning process comprising:

in a first period of time within the first specific line period, while controlling the light source to emit red light onto the reference member in an adjusted light quantity for red light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the red light emitted by the light source;

in a second period of time within the first specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source;

in a third period of time within the first specific line period, while controlling the light source to emit green light onto the reference member in an adjusted light quantity for green light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the green light emitted by the light source; and in a fourth period of time within the first specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source;

perform a second scanning process to scan four lines of the image of the reference member at intervals of a second specific line period, the second scanning process comprising:

in a first period of time within the second specific line period, while controlling the light source to emit red light onto the reference member in the adjusted light quantity for red light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the red light emitted by the light source;

in a second period of time within the second specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source;

in a third period of time within the second specific line period, while controlling the light source to emit blue light in an adjusted light quantity for blue light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the blue light emitted by the light source; and in a fourth period of time within the second specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source;

perform a third scanning process to scan four lines of the image of the reference member at intervals of a third specific line period, the third scanning process comprising:

in a first period of time within the third specific line period, while controlling the light source to emit green light in the adjusted light quantity for green light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the green light emitted by the light source;

in a second period of time within the third specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source;

in a third period of time within the third specific line period, while controlling the light source to emit blue light in the adjusted light quantity for blue light, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with the blue light emitted by the light source; and in a fourth period of time within the third specific line period, while controlling the light source to be turned off, controlling the predetermined number of light receiving elements to scan a single line of the image of the reference member and transmit scanned line data of the reference member to the shift register, the scanned line data comprising a plurality of pieces of read data of the reference member that have been taken by the predetermined number of light receiving elements, respectively, with no light emitted by the light source;

perform a document scanning process to scan three lines of an image of a document at intervals of a particular line period, the document scanning process comprising:

in a first specific period of time within the particular line period, while controlling the light source to emit red light in the adjusted light quantity for red light, controlling the predetermined number of light receiving elements to scan a single line of the image of the reference member and transmit scanned line data of the reference member to the shift register, the scanned line data comprising a plurality of pieces of read data of the document that have been taken by the predetermined number of light receiving elements, respectively, with the red light emitted by the light source;

in a second specific period of time within the particular line period, while controlling the light source to emit green light in the adjusted light quantity for green light, controlling the predetermined number of light receiving elements to scan a single line of the image of the reference member and transmit scanned line data of the reference member to the shift register, the scanned line data comprising a plurality of pieces of read data of the document that have been taken by the predetermined number of light receiving elements, respectively, with the green light emitted by the light source; and in a third specific period of time within the particular line period, while controlling the light source to emit blue light in the adjusted light quantity for blue light, controlling the predetermined number of light receiving elements to scan a single line of the image of the reference member and transmit scanned line data of the reference member to the shift register, the scanned line data comprising a plurality of pieces of read data of the document that have been taken by the predetermined number of light receiving elements, respectively, with the blue light emitted by the light source, wherein the black data acquiring process for each color comprises:

acquiring a plurality of lines of black data for blue and a plurality of lines of black data for red by repeating the first scanning process a plurality of times, each single line of black data for blue comprising a plurality of pieces of black data for blue corresponding to the plurality of pieces of read data of the reference member that have been taken by the predetermined number of light receiving elements, respectively, with no light emitted by the light source in the fourth period of time in the first scanning process, each single line of black data for blue being output from the shift register in the first period of time in the first scanning process, each single line of black data for red comprising a plurality of pieces of black data for red corresponding to the plurality of pieces of read data of the reference member that have been taken by the predetermined number of light receiving elements, respectively, with no light emitted by the light source in the second period of time in the first scanning process, each single line of black data for red being output from the shift register in the third period of time in the first scanning process;

acquiring a plurality of lines of black data for blue and a plurality of lines of black data for green by repeating the second scanning process a plurality of times, each single line of black data for blue comprising a plurality of pieces of black data for blue corresponding to the plurality of pieces of read data of the reference member that have been taken by the predetermined number of light receiving elements, respectively, with no light emitted by the light source in the fourth period of time in the second scanning process, each single line of black data for blue being output from the shift register in the first period of time in the second scanning process, each single line of black data for green comprising a plurality of pieces of black data for green corresponding to the plurality of pieces of read data of the reference member that have been taken by the predetermined number of light receiving elements, respectively, with no light emitted by the light source in the second period of time in the second scanning process, each single line of black data for green being output from the shift register in the third period of time in the second scanning process; and acquiring a plurality of lines of black data for red and a plurality of lines of black data for green by repeating the third scanning process a plurality of times, each single line of black data for red comprising a plurality of pieces of black data for red corresponding to the plurality of pieces of read data of the reference member that have been taken by the predetermined number of light receiving elements, respectively, with no light emitted by the light source in the fourth period of time in the third scanning process, each single line of black data for red being output from the shift register in the first period of time in the third scanning process, each single line of black data for green comprising a plurality of pieces of black data for green corresponding to the plurality of pieces of read data of the reference member that have been taken by the predetermined number of light receiving elements, respectively, with no light emitted by the light source in the second period of time in the third scanning process, each single line of black data for green being output from the shift register in the third period of time in the third scanning process, and wherein the white data acquiring process for each color comprises:

acquiring a plurality of lines of white data for red and a plurality of lines of white data for green by repeating the first scanning process a plurality of times, each single line of white data for red comprising a plurality of pieces of white data for red corresponding to the plurality of pieces of read data of the reference member that have been taken by the predetermined number of light receiving elements, respectively, with the red light emitted by the light source in the first period of time in the first scanning process, each single line of white data for red being output from the shift register in the second period of time in the first scanning process, each single line of white data for green comprising a plurality of pieces of white data for green corresponding to the plurality of pieces of read data of the reference member that have been taken by the predetermined number of light receiving elements, respectively, with the green light emitted by the light source in the third period of time in the first scanning process, each single line of white data for green being output from the shift register in the fourth period of time in the first scanning process;

acquiring a plurality of lines of white data for red and a plurality of lines of white data for blue by repeating the second scanning process a plurality of times, each single line of white data for red comprising a plurality of pieces of white data for red corresponding to the plurality of pieces of read data of the reference member that have been taken by the predetermined number of light receiving elements, respectively, with the red light emitted by the light source in the first period of time in the second scanning process, each single line of white data for red being output from the shift register in the second period of time in the second scanning process, each single line of white data for blue comprising a plurality of pieces of white data for blue corresponding to the plurality of pieces of read data of the reference member that have been taken by the predetermined number of light receiving elements, respectively, with the blue light emitted by the light source in the third period of time in the second scanning process, each single line of white data for blue being output from the shift register in the fourth period of time in the second scanning process; and acquiring a plurality of lines of white data for green and a plurality of lines of white data for blue by repeating the third scanning process a plurality of times, each single line of white data for green comprising a plurality of pieces of white data for green corresponding to the plurality of pieces of read data of the reference member that have been taken by the predetermined number of light receiving elements, respectively, with the green light emitted by the light source in the first period of time in the third scanning process, each single line of white data for green being output from the shift register in the second period of time in the third scanning process, each single line of white data for blue comprising a plurality of pieces of white data for blue corresponding to the plurality of pieces of read data of the reference member that have been taken by the predetermined number of light receiving elements, respectively, with the blue light emitted by the light source in the third period of time in the third scanning process, each single line of white data for blue being output from the shift register in the fourth period of time in the third scanning process.

5. The image scanner according to claim 3,
wherein the black correction data calculating process further comprises:
   calculating each of the plurality of pieces of black correction data for red by averaging the plurality of lines of black data for red with respect to each of the predetermined number of light receiving elements;
   calculating each of the plurality of pieces of black correction data for green by averaging the plurality of lines of black data for green with respect to each of the predetermined number of light receiving elements; and
   calculating each of the plurality of pieces of black correction data for blue by averaging the plurality of lines of black data for blue with respect to each of the predetermined number of light receiving elements, and
wherein the white correction data calculating process further comprises:
   calculating each of the plurality of pieces of white correction data for red by averaging the plurality of lines of white data for red with respect to each of the predetermined number of light receiving elements;
   calculating each of the plurality of pieces of white correction data for green by averaging the plurality of lines of white data for green with respect to each of the predetermined number of light receiving elements; and
   calculating each of the plurality of pieces of white correction data for blue by averaging the plurality of lines of white data for blue with respect to each of the predetermined number of light receiving elements.

6. The image scanner according to claim 4,
wherein the black correction data calculating process further comprises:
   calculating each of the plurality of pieces of black correction data for red by averaging the plurality of lines of black data for red with respect to each of the predetermined number of light receiving elements;
   calculating each of the plurality of pieces of black correction data for green by averaging the plurality of lines of black data for green with respect to each of the predetermined number of light receiving elements; and
   calculating each of the plurality of pieces of black correction data for blue by averaging the plurality of lines of black data for blue with respect to each of the predetermined number of light receiving elements, and
wherein the white correction data calculating process further comprises:
   calculating each of the plurality of pieces of white correction data for red by averaging the plurality of lines of white data for red with respect to each of the predetermined number of light receiving elements;
   calculating each of the plurality of pieces of white correction data for green by averaging the plurality of lines of white data for green with respect to each of the predetermined number of light receiving elements; and
   calculating each of the plurality of pieces of white correction data for blue by averaging the plurality of lines of white data for blue with respect to each of the predetermined number of light receiving elements.

7. The image scanner according to claim 1,
wherein the light-source adjusting process further comprising:
   a current adjusting process comprising:
      adjusting, for each of the plurality of colors, a setting value of electrical current to be applied to the light source to emit light of each color in such a manner that a maximum value of a plurality of pieces of image data output from the image scanning device when the light source emits light of each color during a maximum permissible period of time for the light source to emit light of each color is the particular value; and
      determining, as an adjusted electrical current to be applied to the light source, a maximum value of the plurality of respective setting values of electrical current adjusted for the plurality of colors; and
   a period adjusting process comprising:
      adjusting, for each of the plurality of colors, a setting light-on period of time for the light source to emit light of each color in such a manner that a maximum value of a plurality of pieces of image data output from the image scanning device when the light source emits light of each color with the adjusted electrical current is the particular value; and
      determining, as an adjusted light-on period of time for each color, the plurality of respective setting light-on periods of time adjusted for the plurality of colors.

8. The image scanner according to claim 1,
wherein the controller comprises:
- a processor; and
- a memory storing processor-executable instructions configured to, when executed by the processor, cause the processor to perform the light-source adjusting process, the black data acquiring process, and the black correction data calculating process.

9. A method implementable on a processor coupled with an image scanner, the image scanner comprising an image scanning device including a light source, a predetermined number of light receiving elements, and a shift register, the method comprising:
- performing a light-source adjusting process comprising:
  - adjusting a light quantity of light of each of a plurality of colors to be emitted by the light source, in such a manner that a maximum value of a plurality of pieces of image data of each color output from the image scanning device is a particular value;
- performing black data acquiring process for each of the plurality of colors, the black data acquiring process for an individual particular color comprising:
  - controlling the light source to emit light of each color of the plurality of colors onto an object in the adjusted light quantity for each color in a specific period of time for each color, and to be turned off in a particular period of time;
  - in the particular period of time, while controlling the light source to be turned off, controlling each of the light receiving elements to read an image of the object and transmit read data of the object to the shift register; and
  - in a specific period of time next to the particular period of time, controlling the light source to emit light of a predetermined color different from the particular color, and controlling the shift register to output a plurality of pieces of image data of the object as a plurality of pieces of black data for the particular color, the plurality of pieces of image data corresponding to the plurality of pieces of read data of the object transmitted by the predetermined number of light receiving elements, respectively, a number of the plurality of pieces of read data, a number of the plurality of pieces of image data, and a number of the plurality of pieces of black data for the particular color being equal to the predetermined number; and
- performing black correction data calculating process comprising:
  - calculating a plurality of pieces of black correction data for each color, based on the plurality of pieces of black data for each color, respectively, a number of the plurality of pieces of black correction data for each color being equal to the predetermined number.

10. A non-transitory computer-readable medium storing computer-readable instructions that are executable by a processor coupled with an image scanner, the image scanner comprising an image scanning device including a light source, a predetermined number of light receiving elements, and a shift register, the instructions being configured to, when executed by the processor, cause the processor to:
- perform a light-source adjusting process comprising:
  - adjusting a light quantity of light of each of a plurality of colors to be emitted by the light source, in such a manner that a maximum value of a plurality of pieces of image data of each color output from the image scanning device is a particular value;
- perform black data acquiring process for each of the plurality of colors, the black data acquiring process for an individual particular color comprising:
  - controlling the light source to emit light of each color of the plurality of colors onto an object in the adjusted light quantity for each color in a specific period of time for each color, and to be turned off in a particular period of time;
  - in the particular period of time, while controlling the light source to be turned off, controlling each of the light receiving elements to read an image of the object and transmit read data of the object to the shift register; and
  - in a specific period of time next to the particular period of time, controlling the light source to emit light of a predetermined color different from the particular color, and controlling the shift register to output a plurality of pieces of image data of the object as a plurality of pieces of black data for the particular color, the plurality of pieces of image data corresponding to the plurality of pieces of read data of the object transmitted by the predetermined number of light receiving elements, respectively, a number of the plurality of pieces of read data, a number of the plurality of pieces of image data, and a number of the plurality of pieces of black data for the particular color being equal to the predetermined number; and
- perform black correction data calculating process comprising:
  - calculating a plurality of pieces of black correction data for each color, based on the plurality of pieces of black data for each color, respectively, a number of the plurality of pieces of black correction data for each color being equal to the predetermined number.

* * * * *